US012283412B2

(12) United States Patent
Hong et al.

(10) Patent No.: US 12,283,412 B2
(45) Date of Patent: Apr. 22, 2025

(54) MANUFACTURING METHOD OF MAGNETIC ELEMENT

(71) Applicant: Delta Electronics (Shanghai) Co., Ltd., Shanghai (CN)

(72) Inventors: Shouyu Hong, Shanghai (CN); Ganyu Zhou, Shanghai (CN); Zhiheng Fu, Shanghai (CN); Yan Tong, Shanghai (CN); Qingdong Chen, Shanghai (CN); Xiaoni Xin, Shanghai (CN); Jinping Zhou, Shanghai (CN); Pengkai Ji, Shanghai (CN); Yiqing Ye, Shanghai (CN)

(73) Assignee: Delta Electronics (Shanghai) Co., Ltd., Shanghai (CN)

( * ) Notice: Subject to any disclaimer, the term of this patent is extended or adjusted under 35 U.S.C. 154(b) by 0 days.

(21) Appl. No.: 18/642,793

(22) Filed: Apr. 22, 2024

(65) Prior Publication Data

US 2024/0274345 A1 Aug. 15, 2024

Related U.S. Application Data

(60) Division of application No. 17/024,720, filed on Sep. 18, 2020, now Pat. No. 12,002,615, which is a (Continued)

(30) Foreign Application Priority Data

Nov. 2, 2018 (CN) ......................... 201811301185.4
Sep. 19, 2019 (CN) ......................... 201910886947.X
Sep. 25, 2019 (CN) ......................... 201910912171.4

(51) Int. Cl.
*H01F 27/28* (2006.01)
*H01F 27/24* (2006.01)
(Continued)

(52) U.S. Cl.
CPC ......... *H01F 27/2804* (2013.01); *H01F 27/24* (2013.01); *H01F 27/324* (2013.01);
(Continued)

(58) Field of Classification Search
CPC .... H01F 27/2804; H01F 27/24; H01F 27/324; H01F 41/0206; H01F 41/041; H01F 41/125
(Continued)

(56) References Cited

U.S. PATENT DOCUMENTS 3,826,967 A 7/1974 Wilkinson et al.
4,777,465 A 10/1988 Meinel
(Continued)

FOREIGN PATENT DOCUMENTS

CN 1202265 A 12/1998
CN 1372278 A 10/2002
(Continued)

OTHER PUBLICATIONS

The EESR of corresponding European application 24163741.2 mailed on Jun. 28, 2024.
(Continued)

*Primary Examiner* — Alfonso Perez Borroto
(74) *Attorney, Agent, or Firm* — CKC & Partners Co., LLC

(57) ABSTRACT

The present disclosure provides a manufacturing method of a magnetic element, comprising: forming an insulation layer on an outer side of at least one section of a magnetic column of a magnetic core; forming a metal wiring layer on an outer side of the insulation layer through a metallization process; and dividing at least part of the metal wiring layer into a multi-turn metal winding through a mechanically dividing process.

10 Claims, 27 Drawing Sheets

Related U.S. Application Data continuation-in-part of application No. 16/653,970, filed on Oct. 15, 2019, now Pat. No. 11,664,157.

(51) Int. Cl.
*H01F 27/32* (2006.01)
*H01F 41/02* (2006.01)
*H01F 41/04* (2006.01)
*H01F 41/12* (2006.01)

(52) U.S. Cl.
CPC ....... *H01F 41/0206* (2013.01); *H01F 41/041* (2013.01); *H01F 41/125* (2013.01)

(58) Field of Classification Search
USPC .......................................................... 336/200
See application file for complete search history.

(56) References Cited

U.S. PATENT DOCUMENTS

| | | | |
|---|---|---|---|
| 5,631,822 | A | 5/1997 | Silberkleit et al. |
| 5,877,666 | A | 3/1999 | Johnson, Jr. et al. |
| 6,040,753 | A | 3/2000 | Ramakrishnan et al. |
| 6,188,305 | B1 | 2/2001 | Chang et al. |
| 6,246,311 | B1 | 6/2001 | Finnemore et al. |
| 6,344,786 | B1 | 2/2002 | Chin |
| 7,468,649 | B2 | 12/2008 | Chandrasekaran |
| 8,106,739 | B2 | 1/2012 | Shpiro |
| 8,295,066 | B2 | 10/2012 | Lin |
| 9,001,524 | B1 | 4/2015 | Akre |
| 9,472,334 | B2 | 10/2016 | Syvaranta et al. |
| 10,297,379 | B2 | 5/2019 | Gold et al. |
| 11,664,157 | B2 | 5/2023 | Hong et al. |
| 2004/0183645 | A1 | 9/2004 | Takaya et al. |
| 2005/0088269 | A1 | 4/2005 | Hatano |
| 2007/0139976 | A1 | 6/2007 | deRochemont |
| 2008/0239759 | A1 | 10/2008 | Nakahori |
| 2008/0247195 | A1 | 10/2008 | Nakahori |
| 2009/0109710 | A1 | 4/2009 | Nakahori |
| 2010/0164670 | A1 | 7/2010 | Nakahori et al. |
| 2010/0188183 | A1 | 7/2010 | Shpiro |
| 2010/0232181 | A1 | 9/2010 | Nakahori |
| 2012/0002387 | A1 | 1/2012 | Park et al. |
| 2012/0056297 | A1 | 3/2012 | Akhtar et al. |
| 2013/0027173 | A1 | 1/2013 | Ohsawa |
| 2013/0187743 | A1 | 7/2013 | Chang et al. |
| 2013/0293336 | A1 | 11/2013 | Lo et al. |
| 2013/0328165 | A1 | 12/2013 | Harburg et al. |
| 2014/0062646 | A1 | 3/2014 | Morrissey et al. |
| 2014/0266546 | A1 | 9/2014 | Mao |
| 2015/0235753 | A1* | 8/2015 | Chatani ............... H01F 27/2804 336/200 |
| 2016/0043569 | A1 | 2/2016 | Dally et al. |
| 2016/0086709 | A1 | 3/2016 | Quilici |
| 2016/0261179 | A1 | 9/2016 | Blanchard et al. |
| 2016/0307686 | A1* | 10/2016 | Moon ................... H01F 27/255 |
| 2017/0004915 | A1* | 1/2017 | Park ...................... H01F 27/255 |
| 2017/0018349 | A1 | 1/2017 | Otsubo et al. |
| 2017/0025218 | A1 | 1/2017 | Sugiyama et al. |
| 2017/0032883 | A1* | 2/2017 | Hong .................... H01F 41/046 |
| 2017/0084384 | A1 | 3/2017 | Otsubo et al. |
| 2017/0117090 | A1 | 4/2017 | Liu et al. |
| 2017/0178787 | A1 | 6/2017 | Massolini et al. |
| 2017/0222562 | A1 | 8/2017 | Nakahori |
| 2017/0345756 | A1 | 11/2017 | Yin et al. |
| 2018/0175736 | A1 | 6/2018 | Ishigaki |
| 2018/0211761 | A1 | 7/2018 | Zhang et al. |

FOREIGN PATENT DOCUMENTS

| | | | |
|---|---|---|---|
| CN | 1516205 | A | 7/2004 |
| CN | 1747083 | A | 3/2006 |
| CN | 101051549 | A | 10/2007 |
| CN | 101322201 | A | 12/2008 |
| CN | 201348924 | Y | 11/2009 |
| CN | 201478093 | U | 5/2010 |
| CN | 101772264 | A | 7/2010 |
| CN | 102360852 | A | 2/2012 |
| CN | 102428528 | A | 4/2012 |
| CN | 102460608 | A | 5/2012 |
| CN | 202839237 | U | 3/2013 |
| CN | 103269149 | A | 8/2013 |
| CN | 103943306 | A | 7/2014 |
| CN | 104376955 | A | 2/2015 |
| CN | 105099132 | A | 11/2015 |
| CN | 105261459 | A | 1/2016 |
| CN | 105304287 | A | 2/2016 |
| CN | 205177580 | U | 4/2016 |
| CN | 205194481 | U | 4/2016 |
| CN | 205194482 | U | 4/2016 |
| CN | 105590734 | A | 5/2016 |
| CN | 105789031 | A | 7/2016 |
| CN | 205542253 | U | 8/2016 |
| CN | 106030733 | A | 10/2016 |
| CN | 106328633 | A | 1/2017 |
| CN | 103943306 | B | 4/2017 |
| CN | 206389608 | U | 8/2017 |
| CN | 107171532 | A | 9/2017 |
| CN | 107210123 | A | 9/2017 |
| CN | 107294390 | A | 10/2017 |
| CN | 207082424 | U | 3/2018 |
| CN | 107154301 | B | 12/2018 |
| CN | 109003779 | A | 12/2018 |
| CN | 105529157 | B | 2/2019 |
| DE | 3732249 | A1 | 4/1989 |
| DE | 19725865 | A1 | 1/1998 |
| DE | 19954682 | C1 | 8/2001 |
| EP | 3648128 | A2 | 5/2020 |
| EP | 4170689 | A1 | 4/2023 |
| JP | S59186313 | A | 10/1984 |
| JP | H05315520 | A | 11/1993 |
| JP | 2008305620 | A | 12/2008 |
| JP | 2015228436 | A | 12/2015 |
| TW | 490688 | B | 6/2002 |
| TW | 201023216 | A | 6/2010 |
| TW | 201440089 | A | 10/2014 |
| WO | 2020033325 | A1 | 2/2020 |
| WO | 2022006691 | A1 | 1/2022 |

OTHER PUBLICATIONS

Khan Afia et al., "Design and Comparative Analysis of Litz and Copper Foil Transformers for High Frequency Applications," 2018 20th European Conference on Power Electronics and Applications (EPE'18 ECCE Europe), Sep. 17, 2018, 10 pages.
Corresponding European search report issued on Feb. 13, 2020.
Corresponding European office action issued on Mar. 19, 2021.
Corresponding China office action issued on Apr. 6, 2021.
Corresponding China Office Action issued on 2021-07-26.
Office Action of U.S. Appl. No. 16/671,158 mailed on 2021-09-03.
Corresponding China Office Action issued on 2022-04-19.
Corresponding China Notice of Allowance issued on Oct. 19, 2022.
Corresponding US office action issued on Dec. 8, 2022.
Corresponding US Office Action issued on Mar. 1, 2023.
Corresponding US Notice of Allowance issued on Mar. 20, 2023.
Corresponding extended European search report issued on Jun. 19, 2023.
Office action of U.S. Appl. No. 16/671,153 issued on Sep. 22, 2023.
Corresponding European search report issued on Feb. 26, 2024.
NOA of U.S. Appl. No. 18/301,977 issued on Jan. 24, 2024.
Office action of U.S. Appl. No. 17/024,720 issued on Aug. 11, 2023.
NOA of U.S. Appl. No. 17/024,720 issued on Jan. 24, 2024.

* cited by examiner

MANUFACTURING METHOD OF MAGNETIC ELEMENT

CROSS-REFERENCE TO RELATED APPLICATIONS

This application is a divisional application of U.S. patent application Ser. No. 17/024,720, filed on Sep. 18, 2020, which is a continuation-in-part of U.S. patent application Ser. No. 16/653,970, filed on Oct. 15, 2019, U.S. Pat. No. 11,664,157, issued on May 30, 2023, which was based on, and claims priority from, Chinese Patent Application No. 201811301185.4 filed on Nov. 2, 2018, Chinese Patent Application No. 201910886947.X filed on Sep. 19, 2019, and Chinese Patent Application No. 201910912171.4 filed on Sep. 25, 2019. All of the aforementioned patent applications are hereby incorporated by reference in their entireties.

TECHNICAL FIELD

The present disclosure relates to the field of power electronic technologies and, in particular, to a magnetic element, a manufacturing method of a magnetic element, and a power module.

BACKGROUND

With the improvement of human requirements for intelligent life, social needs for data processing are increasingly strong. The global energy consumption in data processing averages up to hundreds of billions or even trillions of kilowatt-hours every year, and the footprint of a large-scale data center may be up to tens of thousands of square meters. Therefore, high efficiency and high power density are the key indicators for this industry in the healthy development. The key unit of a data center is a server, and its mainboard is generally composed of data processing chips, such as a central processing unit (CPU), chipsets and a memory, as well as their power supply and essential peripheral components. With the increase in the processing capability of the server per unit volume, it means that the number and integration of these processing chips are also increasing, which results in an increase in space occupation and power consumption. Therefore, the power supply (which is also referred to as a mainboard power supply since the power supply is located on the same mainboard as the data processing chips) for these chips is expected to have higher efficiency, higher power density and smaller volume to meet the requirements of energy saving and footprint reduction for the entire server and even the entire data center. In order to meet the demand for high power density, the switching frequency of the power supply is increasingly higher. The switching frequency of low-voltage high-current power supplies in the industry is basically above 1 megahertz (MHz).

For transformers in low-voltage high-current applications, an implementation of a multilayer printed circuit board (PCB) is mostly adopted in the related art. FIG. 1 is a side view of a transformer with a multilayer PCB according to the prior art. As shown in FIG. 1, a flat winding process is used for forming this metal winding on the PCB wiring layer, i.e. the winding is a plane (for example a winding layer) formed on the PCB, while the PCB is generally disposed sleeving a magnetic column, which makes the magnetic column perpendicular or approximately perpendicular to the PCB, thereby the magnetic column is perpendicular or approximately perpendicular to the winding wiring layers formed on the PCB. Being limited to forming the winding in the wiring layer, it is assumed that in a direction parallel to the length of the magnetic column, the size (for example a wiring thickness) of the metal winding formed on the wiring layer is W, and in a direction perpendicular to the length of the magnetic column, the size (for example a wiring width) of the metal winding formed on the wiring layer is H. Generally speaking, H and W satisfy the following relationship: H>10 W, and this kind of wiring-layer metal winding is generally referred to as a wiring-layer metal winding with a vertical-winding structure.

For the above wiring-layer metal winding with the vertical-winding structure provided in the related art, even all of wiring layers that are mutually parallel are connected through vias, since the wiring layers for main wiring are perpendicular to the magnetic column, and the vias are perpendicular to the wiring layers, the vias are inevitably parallel to the magnetic column when the vertical winding is implemented, which makes magnetic flux hardly interlink in a singular via. Since the inner wiring layer is generally connected to the surface layer of the PCB through vias and thereby connected to the pins, when the vertical winding is implemented, the length of the vias is large, the number of the vias is small, and the loss caused by the vias is great. And meanwhile, it is assumed that the wiring-layer metal winding with the vertical-winding structure is a ring in a horizontal direction, and the width of the ring is H. It can be seen that under the vertical winding, for the ring formed by the metal winding, the impedance of the outer part which is away from the magnetic column may be different from that of the inner part which is close to the magnetic column, for reasons such as the circumferential length of the inner ring is inconsistent with that of the outer ring and the like, resulting in a problem of uneven current distribution.

SUMMARY

The present disclosure provides a magnetic element, a manufacturing method of a magnetic element, and a power module, which can solve the problem of uneven current distribution of metal windings of the magnetic element in the prior art.

In a first aspect, an embodiment of the present disclosure provides a magnetic element, including:

- a magnetic core; and
- a metal wiring layer, where the metal wiring layer is flat wound on a surface of at least one section of a magnetic column of the magnetic core, the metal wiring layer includes a vertical portion and a horizontal portion, and at least part of the vertical portion forms a multi-turn metal winding by mechanically dividing.

In a second aspect, an embodiment of the present disclosure provides a manufacturing method of a magnetic element, including:

- forming an insulation layer on an outer side of at least one section of a magnetic column of a magnetic core;
- forming a metal wiring layer on an outer side of the insulation layer through a metallization process; and
- dividing at least part of the metal wiring layer into a multi-turn metal winding through a mechanically dividing process.

In a third aspect, an embodiment of the present disclosure provides a power module, including: a power switch and the aforementioned magnetic element, where the power switch is electrically connected with a winding in the magnetic element.

According to the magnetic element and the manufacturing method of the magnetic element provided in the embodiments, a multi-turn metal winding structure can be provided on the periphery of the magnetic core through the mechanically dividing process. The manufacturing process is a sophisticated process adopted in mass production, in which a continuous processing is adopted for convenience of a large-scale production with a relatively low cost. In terms of electrical characteristics, since the distance of the formed metal winding to the same surface of the magnetic core is almost equal, i.e. the equivalent diameters of all parts of a foil-winding structural winding are close, the equivalent impedances thereof are close, which realizes an even distribution of the current in the metal winding.

BRIEF DESCRIPTION OF DRAWING(S)

In order to illustrate the technical solutions of embodiments of the present disclosure or in the prior art more clearly, accompanying drawings used for describing the embodiments or the prior art are introduced briefly as following. Obviously, the accompanying drawings in the descriptions below are some of the embodiments of the present disclosure, and for a person skilled in the art, other drawings can also be obtained according to these accompanying drawings without any creative effort.

Figure 31:
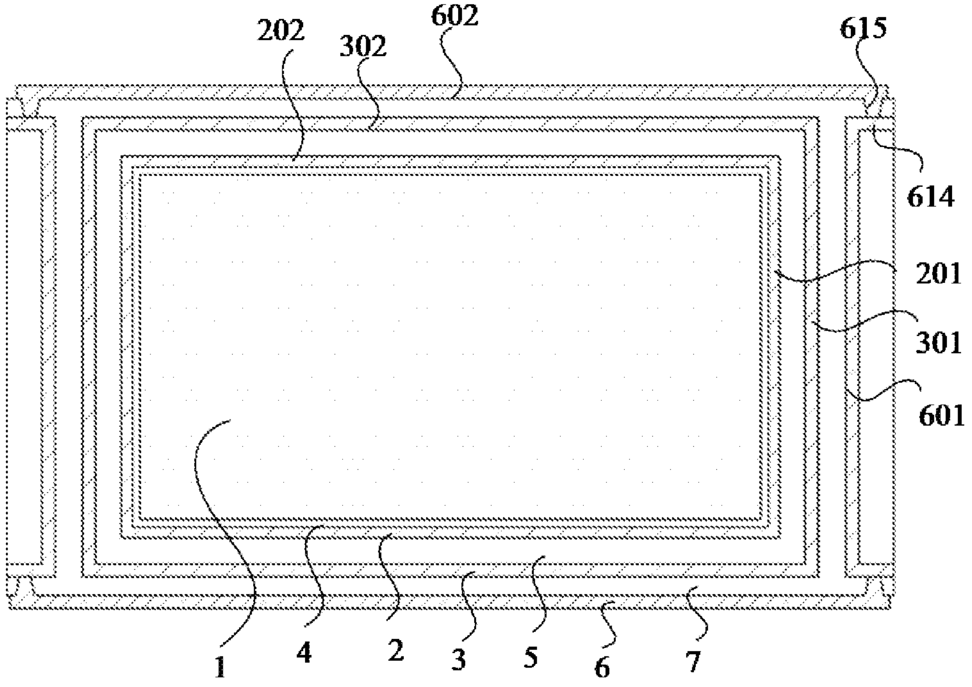
FIG. 31 is a schematic structural diagram of a sixth magnetic element according to Embodiment 3 of the present disclosure.
Figure 31A:
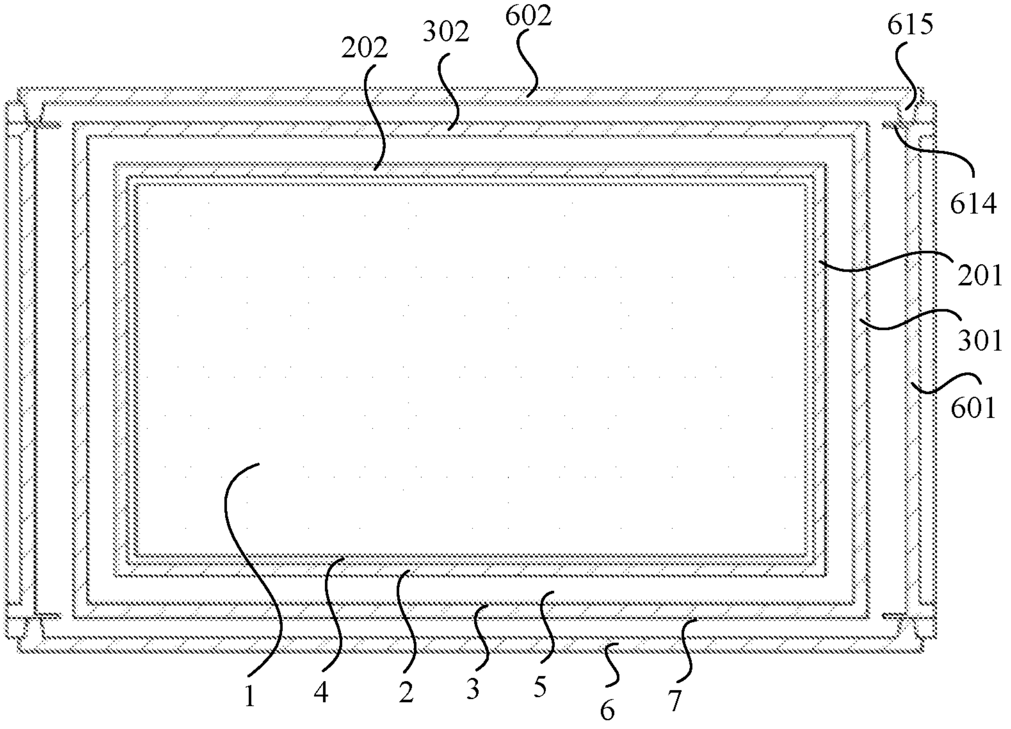
Figure 31B:
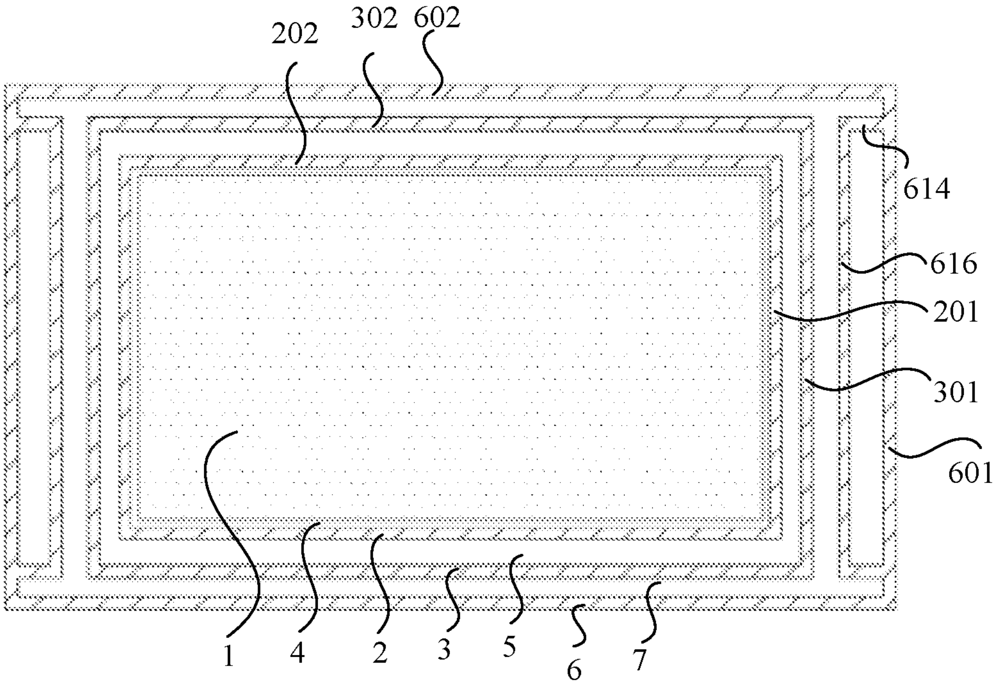
Figure 31C:
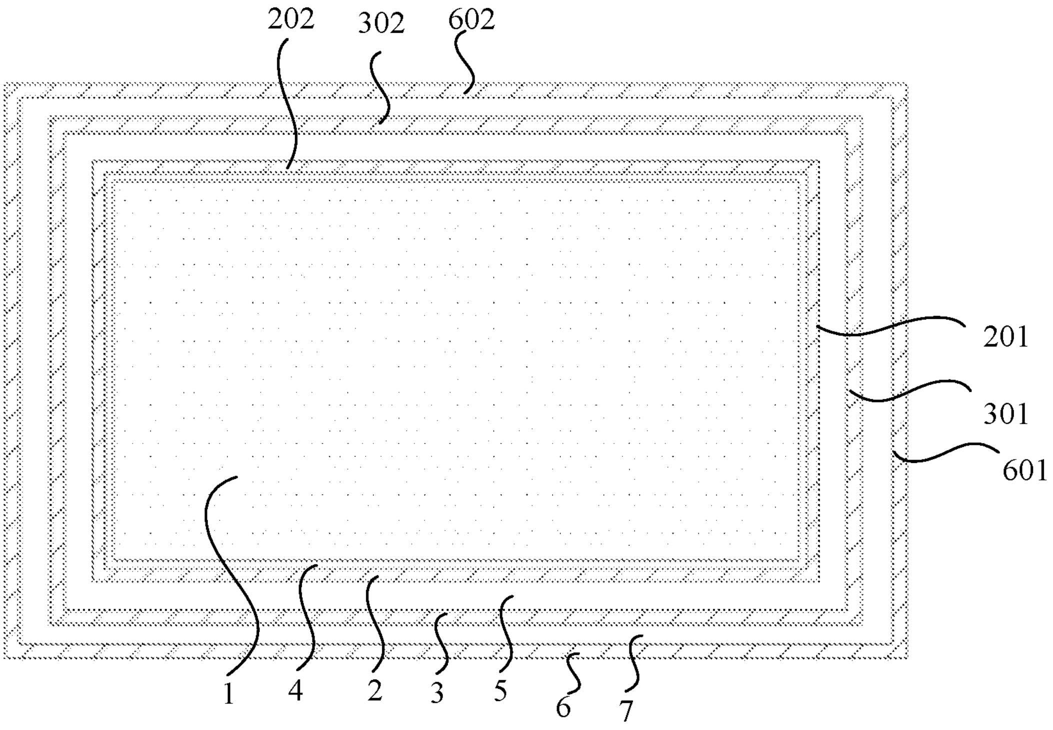
Figure 31D:
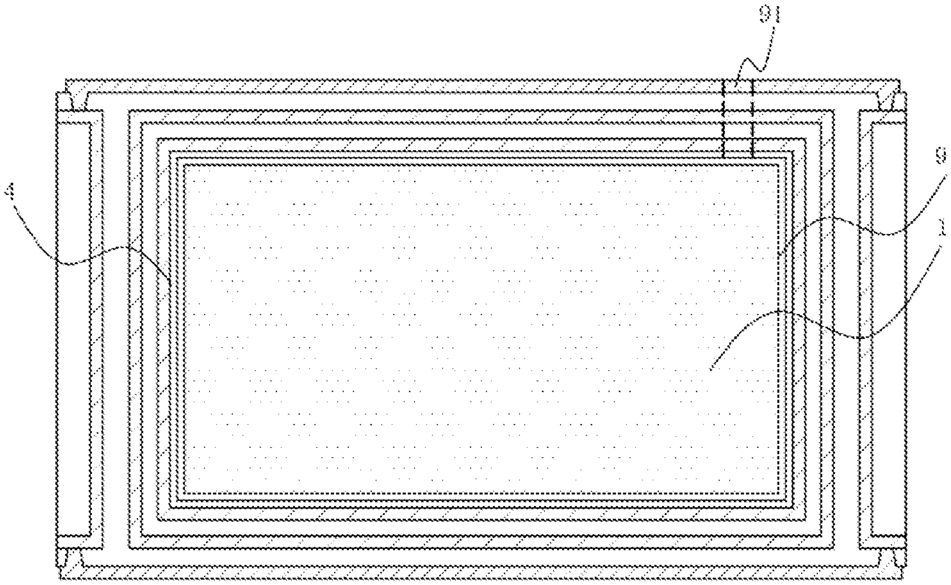
Figure 32:
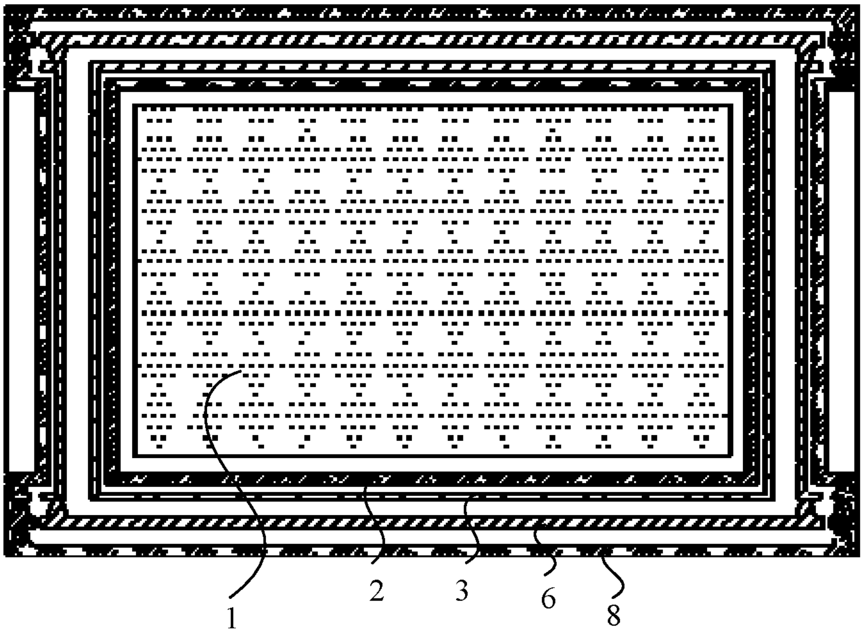
Figure 33:
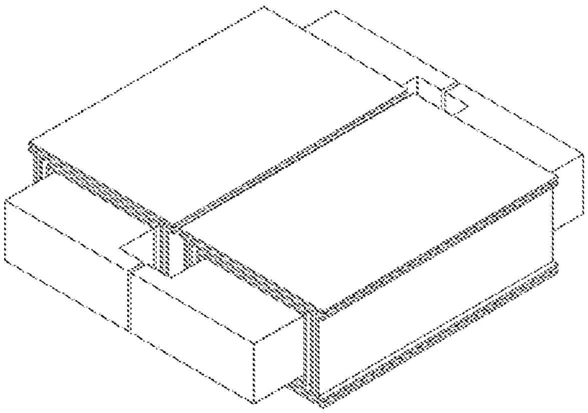
Figure 34:
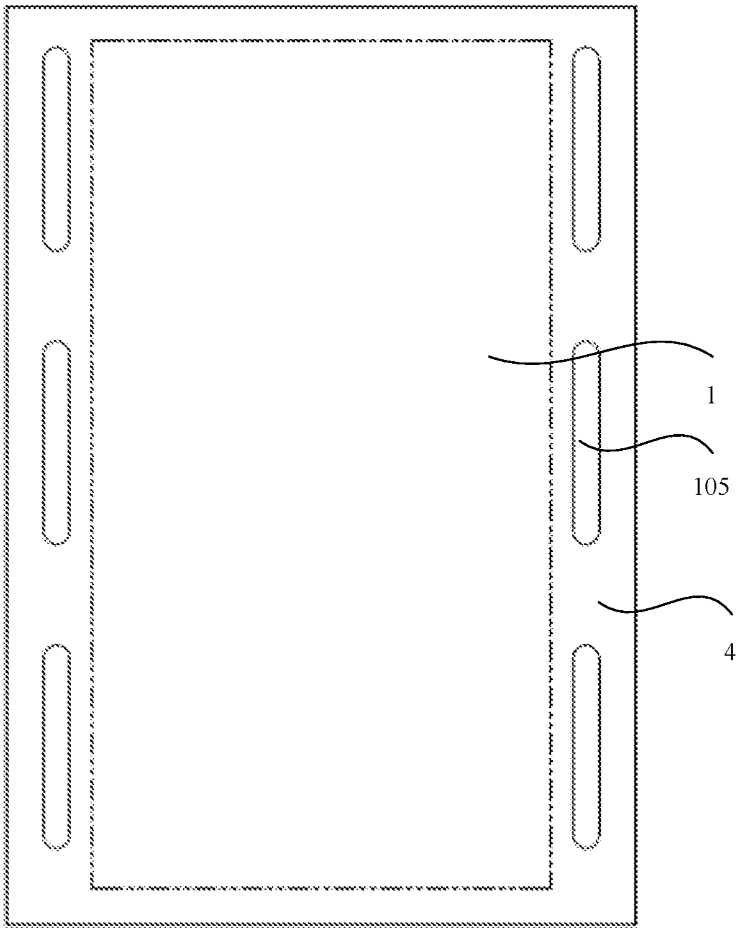
Figure 35:
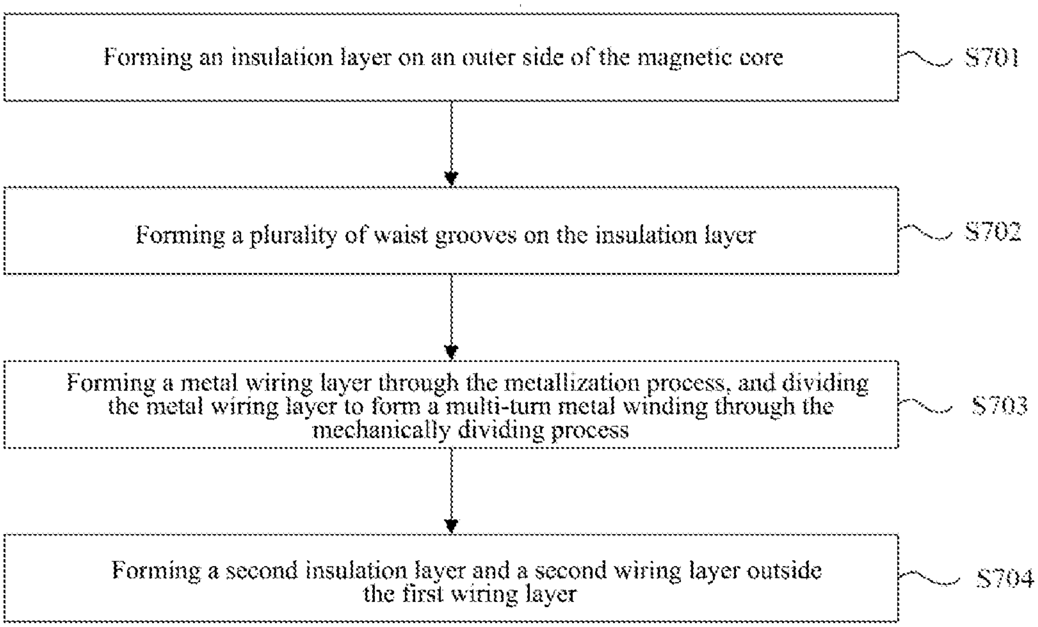
Figure 36:
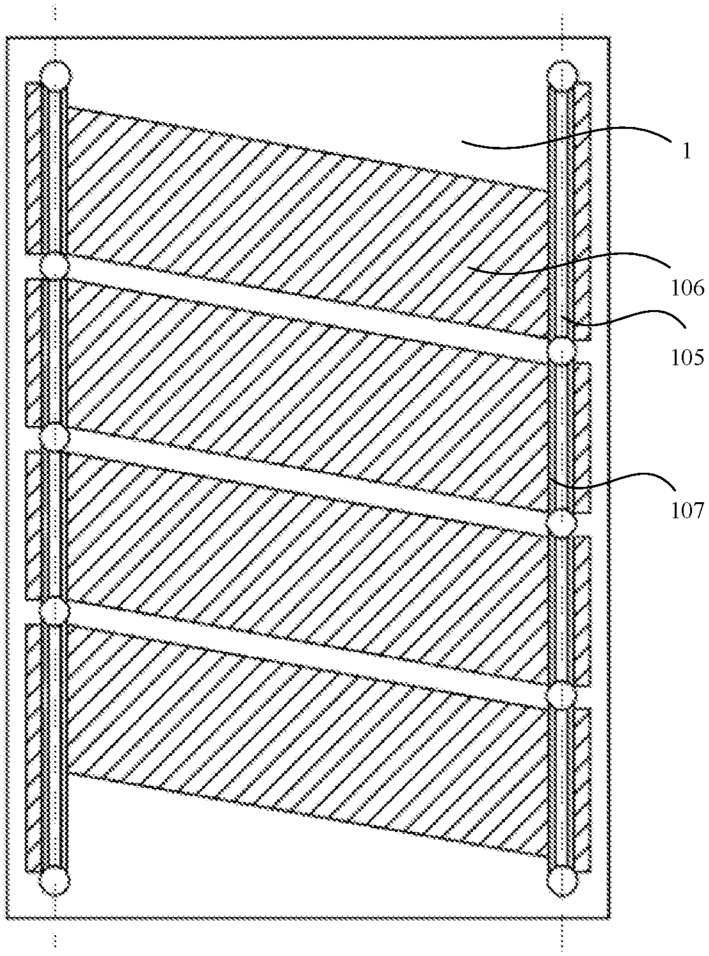
Figure 37:
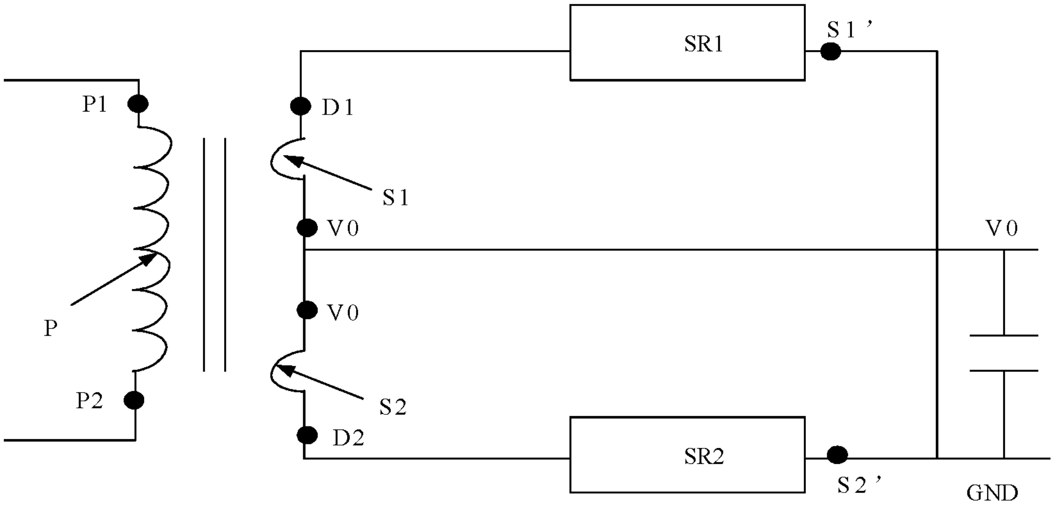
Figure 38:
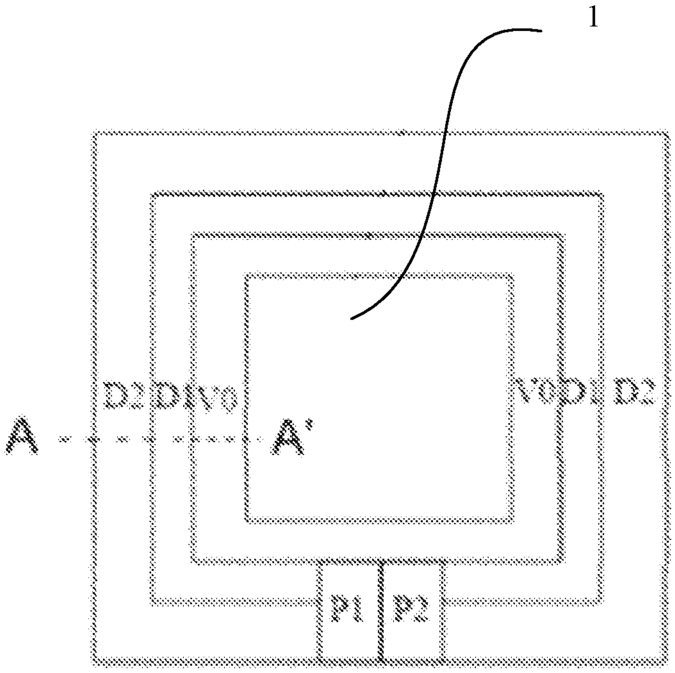
Figure 39:
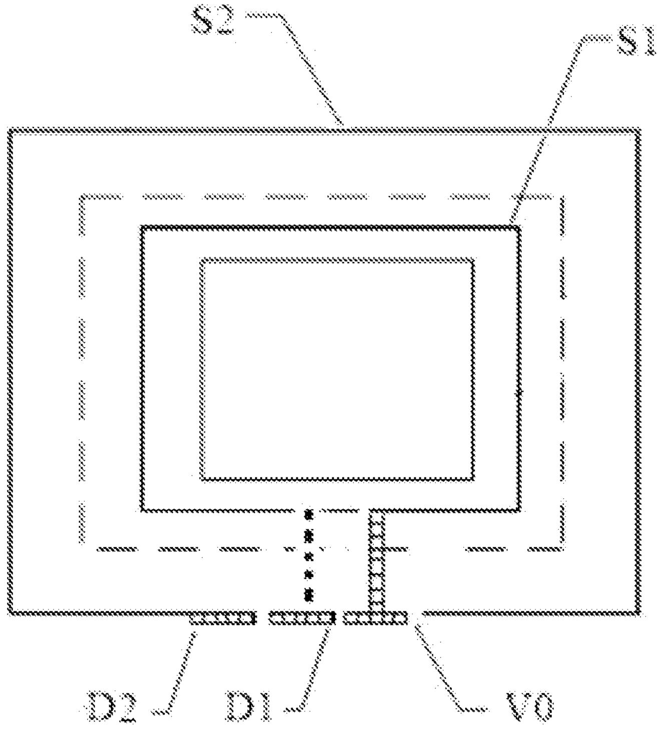
Figure 40:
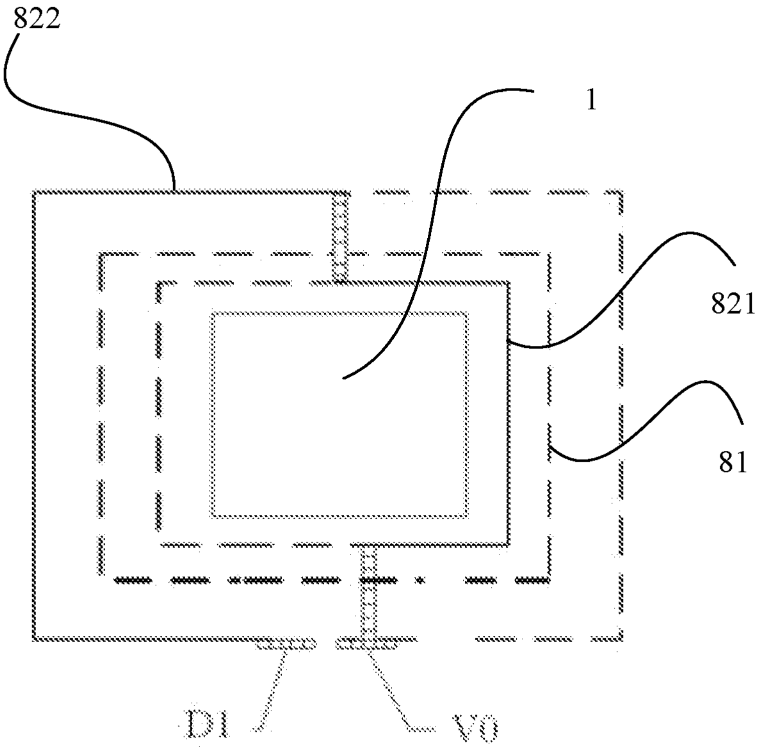
Figure 41:
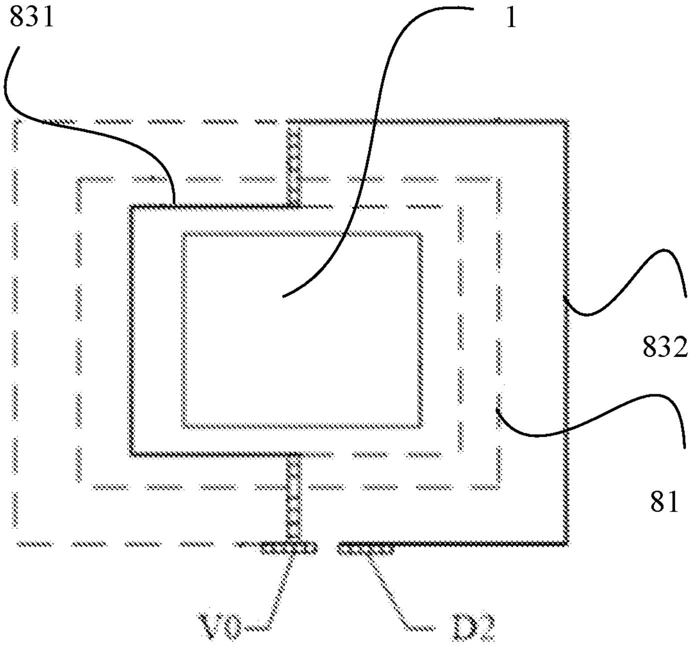

FIG. 31*a* is a schematic structural diagram of a variant 1 of the sixth magnetic element according to Embodiment 3 of the present disclosure;

FIG. 31*b* is a schematic structural diagram of a variant 2 of the sixth magnetic element according to Embodiment 3 of the present disclosure;

FIG. 31*c* is a schematic structural diagram of a variant 3 of the sixth magnetic element according to Embodiment 3 of the present disclosure;

FIG. 31*d* is a schematic structural diagram of a variant 4 of the sixth magnetic element according to Embodiment 3 of the present disclosure;

FIG. 32 is a schematic structural diagram of a seventh magnetic element according to Embodiment 3 of the present disclosure;

FIG. 33 is a schematic structural diagram of a magnetic element formed by butting two units according to an embodiment of the present disclosure;

FIG. 34 is a schematic structural diagram 1 of a magnetic element according to Embodiment 4 of the present disclosure;

FIG. 35 is a flowchart of a manufacturing method of a magnetic element according to Embodiment 4 of the present disclosure;

FIG. 36 is a schematic structural diagram 2 of a magnetic element according to Embodiment 4 of the present disclosure;

FIG. 37 is a schematic electrical diagram of terminals of a power module according to Embodiment 5 of the present disclosure;

FIG. 38 is a top view of a structure of a transformer module in a power module according to Embodiment 5 of the present disclosure;

FIG. 39 is a schematic diagram 1 of an arrangement of metal windings according to Embodiment 5 of the present disclosure;

FIG. 40 is a schematic diagram 2 of an arrangement of metal windings according to Embodiment 5 of the present disclosure;

FIG. 41 is a schematic diagram 3 of an arrangement of metal windings according to Embodiment 5 of the present disclosure.

REFERENCE SIGNS

1: magnetic core; 101: insulation layer; 102: PCB core board; 103: insulation material; 104: transitional layer; 105: waist groove; 106: surface copper; 107: first hole copper; 2: first wiring layer; 201: first vertical portion; 202: first horizontal portion; 3: second wiring layer; 301: second vertical portion; 302: second horizontal portion; 303: first transitional horizontal portion; 304: first conductive cylinder; 305: first additional vertical portion; 4: first insulation layer; 5: second insulation layer; 6: third wiring layer; 601: third vertical portion; 602: third horizontal portion; 603: second transitional horizontal portion; 604: third transitional horizontal portion; 605: second conductive cylinder; 606: third conductive cylinder; 607: second additional vertical portion; 608: fourth transitional horizontal portion; 609: fifth transitional horizontal portion; 610: fourth conductive cylinder; 611: fifth conductive cylinder; 612: sixth transitional horizontal portion; 613: sixth conductive cylinder; 614: seventh transitional horizontal portion; 615: seventh conductive cylinder; 616: third additional vertical portion; 7: third insulation layer; 821: first section of winding; 822: second section of winding; 831: third section of winding; 832: fourth section of winding; 81: second metal winding; 9: low-melting-point material; 91: exhaust channel.

DESCRIPTION OF EMBODIMENTS

In order to make the objectives, technical solutions and advantages of the present disclosure more clear, the technical solutions of the present disclosure will be described clearly and completely in combination with the accompanying drawings in the present disclosure. Obviously, the described embodiments are part, but not all, of the embodiments of the present disclosure. Based on the embodiments of the present disclosure, all other embodiments acquired by a person skilled in the art without any creative effort fall into the protection scope of the present disclosure.

The present disclosure is described below with reference to the accompanying drawings and in combination with specific embodiments.

Embodiment 1

An embodiment of the present disclosure provides a magnetic element, including: a magnetic core 1; and a metal wiring layer, where the metal wiring layer is flat wound on the surface of at least one section of a magnetic column of the magnetic core 1, the metal wiring layer includes a vertical portion and a horizontal portion, and at least part of the vertical portion forms a multi-turn metal winding by mechanically dividing.

Figure 1:
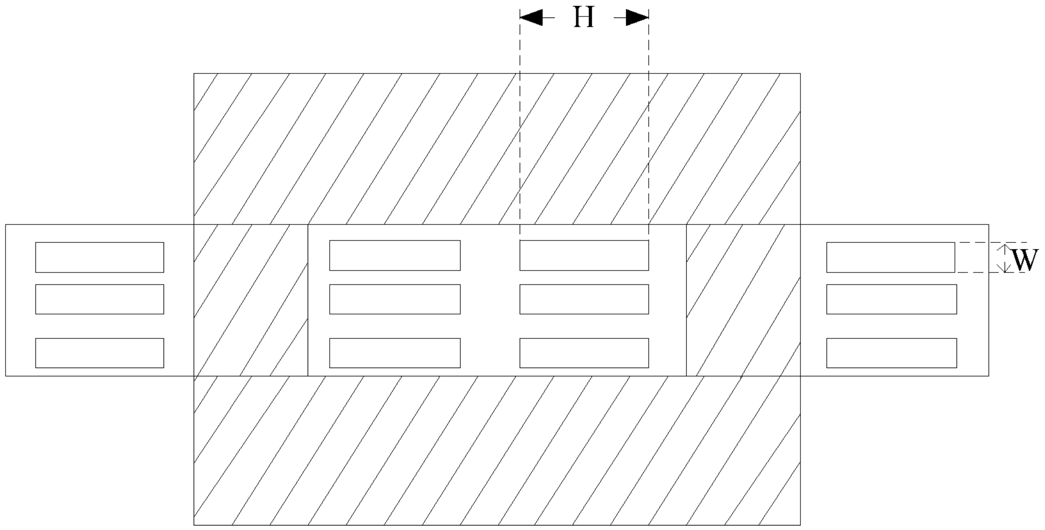
FIG. 1 (Prior Art)
FIG. 1 is a side view of a transformer with a multilayer PCB according to the prior art.
Figure 2:
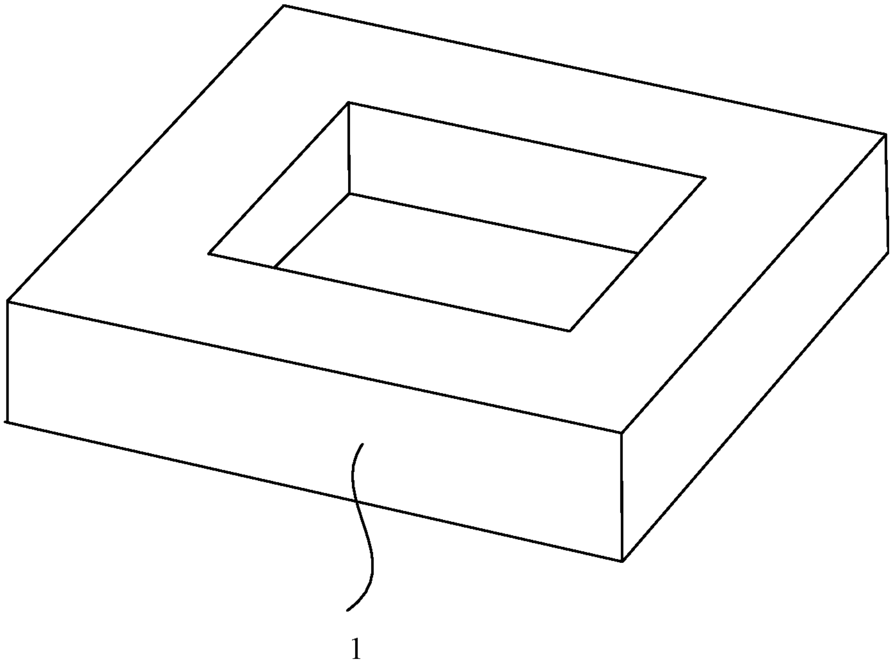
FIG. 2 is a schematic structural diagram of a magnetic core according to an embodiment of the present disclosure.

The magnetic core 1 may be a ring formed by one section of magnetic column, or may be of other shapes, such as a triangular-loop shape, a "‘|||’" shape (a shape similar to a square having four square openings, wherein the four square openings are stacked two by two), and a "回" shape (a shape similar to a hollow square which is encircled with another hollow square), which are formed by multiple sections of magnetic columns. This embodiment defines no limitations to the specific structure of the magnetic core here. FIG. 2 is a schematic structural diagram of a magnetic core according to an embodiment of the present disclosure. Referring to FIG. 2, the magnetic core 1 is a loop-shaped body formed by at least one section of magnetic column through an end-to-end connection, such as a "回"-shaped structure formed through an end-to-end connection, where the magnetic core 1 contains a window of a "冂" shape (a shape similar to a square opening). The magnetic core 1 may be formed integrally by multiple magnetic columns, or may be formed by splicing multiple magnetic columns that are separately manufactured. In particular, an adhesive material with a low magnetic permeability may be provided between each two of spliced parts to form an air gap. During a process of manufacturing the magnetic core 1, a window may be provided on the magnetic core 1 firstly. The window may be directly formed by a mould while moulding the magnetic core 1, or may be processed on a magnetic substrate, where the first method has a characteristic of easy processing, and the second method has an advantage of high dimensional accuracy. The embodiments of the present disclosure are not limited to these.

Figure 3:
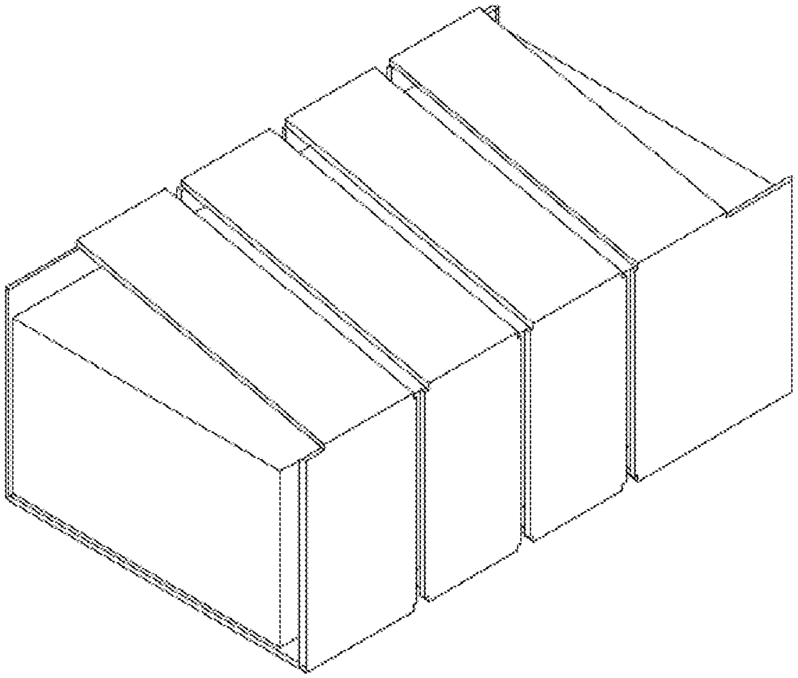
FIG. 3 is a schematic structural diagram of a magnetic element with a multi-turn metal winding according to an embodiment of the present disclosure.

The formed metal wiring layer is flat wound on the surface of at least one section of the magnetic column of the magnetic core 1. By taking one section of the magnetic column of the magnetic core as an example, FIG. 3 is a schematic structural diagram of a magnetic element having a multi-turn metal winding according to an embodiment of the present disclosure.

Structures and manufacturing processes of the magnetic element are illustrated below with reference to figures of one section of the magnetic column of the magnetic core.

Figure 4:
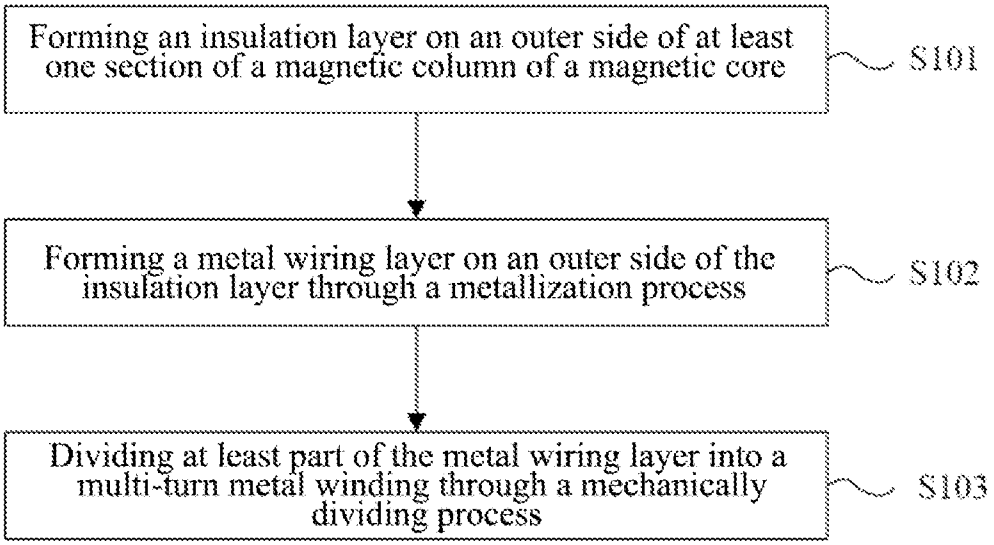
FIG. 4 is a schematic flowchart of a manufacturing method of a magnetic element according to Embodiment 1 of the present disclosure.

FIG. 4 is a schematic flowchart of a manufacturing method of a magnetic element according to Embodiment 1 of the present disclosure. Referring to FIG. 4, the manufacturing method of the magnetic element includes the following steps.

S101, forming an insulation layer 101 on an outer side of at least one section of the magnetic column of the magnetic core 1.

Figure 5:
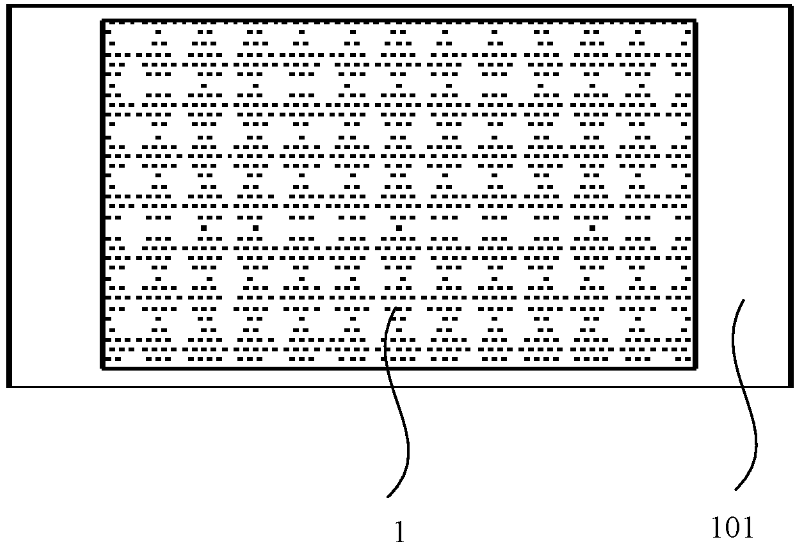
FIG. 5 is a schematic cross-sectional diagram of a structure of a magnetic core and an insulation layer according to Embodiment 1 of the present disclosure.

FIG. 5 is a schematic cross-sectional diagram of a structure of a magnetic core and an insulation layer according to Embodiment 1 of the present disclosure. Referring to FIG. 5, specifically, the magnetic core 1 is coated with an insulation layer 101 (such as molding compound), and the magnetic core 1 is integrated with the insulation material after curing. The insulation material is required to be higher than the surface of the magnetic core 1 by a certain height, which can make the metal layer formed after the subsequent metallization process also have a better flatness due to a relatively good flatness of the surface of the insulation layer so as to reduce process defects, in addition to avoiding the direct contact of a lamination fixture with the magnetic core 1 which causes damage to the magnetic core 1 and playing an insulation role.

Figure 6:
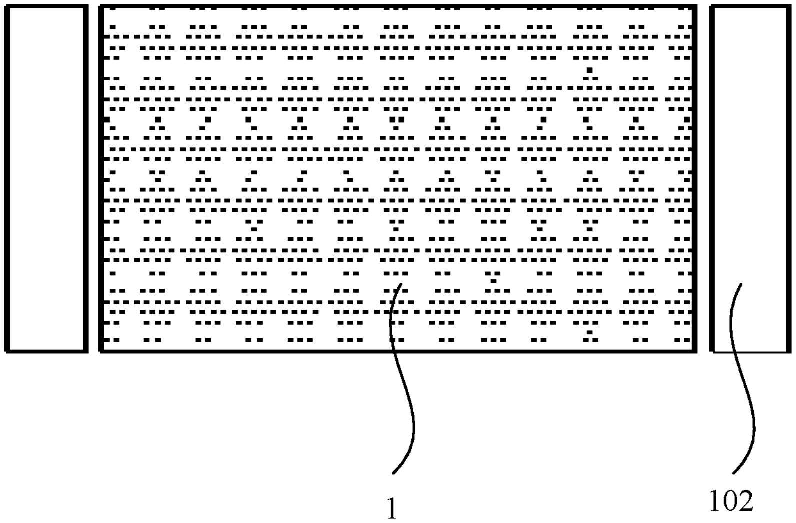
FIG. 6 is a schematic cross-sectional diagram of a structure of a magnetic core and a PCB core board according to an embodiment of the present disclosure.
Figure 7:
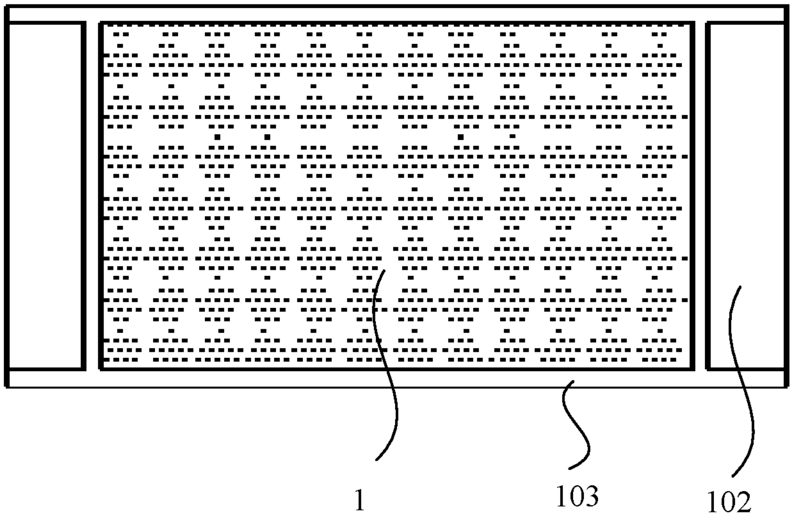
FIG. 7 is a schematic cross-sectional diagram of a structure of a magnetic core, a PCB core board and an insulation material according to an embodiment of the present disclosure.

It should be noted in particular that the magnetic core 1 may be coated with the insulation layer 101 through one or two processes. For example, stick the magnetic core 1 on a temporary adhesive tape to fix the position of the magnetic core 1; then press a part of the insulation layer 101 from the side of the magnetic core where the temporary adhesive tape is not attached, and ensure that the insulation layer 101 is higher than the surface of the magnetic core by a certain height; and provide the other part of the insulation layer 101 on the surface after removing the temporary adhesive tape. FIG. 6 is a schematic cross-sectional diagram of a structure of a magnetic core and a PCB core board according to an embodiment of the present disclosure. FIG. 7 is a schematic cross-sectional diagram of a structure of a magnetic core, a PCB core board and an insulation material according to an embodiment of the present disclosure. Firstly, select a PCB core board 102 with a height close to that of the magnetic core 1; process the PCB core board 102 to form an empty groove on a predetermined position for accommodating the magnetic core 1; embed the magnetic core 1 into the empty groove, and ensure that the magnetic core 1 and the PCB core board 102 are located on a same horizontal plane. For example, the position of the magnetic core 1 in the PCB empty groove can be located by co-planarly sticking the magnetic core 1 and the PCB core board 102 on an adhesive tape. In this case, since there is a gap between the PCB core board 102 and the magnetic core 1 with a certain distance, a part of an insulation material 103 is then pressed to fill the gap and ensure that the insulation material 103 is higher than the surface of the PCB core board 102 by a certain height; and the other part of the insulation material 103 is provided on the surface after removing the adhesive tape. The PCB core board 102 and the insulation material 103 form the insulation layer 101 of the magnetic element structure.

The height of the PCB core board 102 may be slightly higher than that of the magnetic core 1, or may be slightly lower than that of the magnetic core 1. The pressed insulation material 103 and the material of the PCB core board 102 may be the same series or different series of materials. For example, both of the material of the insulation material 103 and the material of the PCB core board 102 may be a reinforced fiber composite material which is generally used in the PCB and has a relatively strong tensile strength; or, a combination of materials of different series may be selected, for example, the PCB core board 102 may be made of the reinforced fiber composite material, and the pressed insulation material 103 may be made of an epoxy resin material, which is not limited here.

In another feasible implementation, the magnetic core may be covered by the insulation layer 101 by molding process and ensuring that the molding compound is beyond both of an upper surface and a lower surface of the magnetic core 1 by a certain height, so that the magnetic core 1 and the insulation material are bonded as a whole after a curing reaction.

Figure 8:
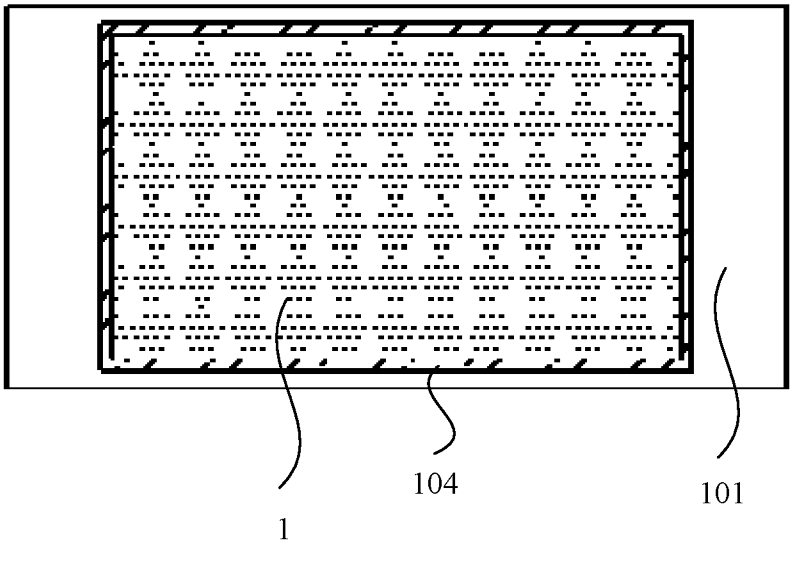
FIG. 8 is a schematic cross-sectional diagram of a structure of a magnetic core and a transitional layer according to an embodiment of the present disclosure.

FIG. 8 is a schematic cross-sectional diagram of a structure of a magnetic core and a transitional layer according to an embodiment of the present disclosure. Referring to FIG. 8, optionally, the magnetic core 1 may also be embedded into the insulation layer 101 after a transitional layer 104 is formed on the magnetic core surface.

The transitional layer 104 formed on the surface of the magnetic core 1 generally has the following functions. (1) Insulation function. For example, when the magnetic material used in the magnetic core 1 is a material having a relatively low surface insulation resistance, such as MnZn ferrite, a transitional layer may be added to reduce the inter-turn leakage. With respect to a transformer required to be isolated, there are relatively high requirements of withstanding voltage for its primary side and secondary side, and a transitional layer may be provided on the surface of the magnetic core to meet the safety requirements for withstanding voltage. In addition, the transitional layer materials that commonly act as an insulation layer are in the group consisting of epoxy resin, organosilicon, acetal-type materials, polyester-type materials, polyester-imine-type materials, polyimide-type materials, parylene and others. (2) Cohesion enhancement function. For example, when the cohesion between the surface of the magnetic material and the metal wiring layer formed subsequently is not strong enough, a cohesion enhancement coating, such as epoxy resin, may be applied, so as to increase the cohesion between the magnetic material itself and the metal wiring layer formed subsequently, or to make it easy to achieve a good cohesion through surface treatments (such as processes of roughening, and surface modification). (3) Stress relief function. For example, when the selected magnetic material is a stress-sensitive material, such as a ferrite-type material, in order to avoid or reduce the stress generated on the magnetic material during subsequent manufacturing processes which may result in a degradation in magnetic properties, such as an increase in loss or a reduction in magnetic permeability, a stress relief material, such as organosilicon, may be provided. (4) Magnetic core protection function, which avoids affecting the property of the magnetic core by the adjacent material. (5) Surface smoothing function, such as improving a flatness of the surface of the magnetic core so as to executing the latter processes smoothly, etc.

In a possible implementation, the transitional layer 104 may be formed on the surface of at least one section of the magnetic column of the magnetic core by spraying, dipping, electrophoresis, electrostatic spraying, chemical vapor deposition, physical vapor deposition, sputtering, evaporation plating or printing.

S102, forming a metal wiring layer on an outer side of the insulation layer 101 through a metallization process.

Specifically, a metal wiring layer composed of copper or copper alloy may be formed on the surface of the insulation layer 101 through the metallization process. The metallization process includes electroplating or chemical plating. When a relatively small thickness (such as 10 to 20 μm) of the metal wiring layer is required, the chemical plating may be implemented, and in this case, the metal wiring layer has a relatively small current flow capacity. When a relatively large current flow capacity is required, the electroplating may be implemented to form the metal wiring layer. Certainly, before the electroplating, a seed layer may be provided by chemical plating, sputtering, evaporation plating and the like to provide functions of surface conduction and cohesion enhancement. In practical application, the metal wiring layer may be formed on the surface of at least one section of the magnetic column of the magnetic core 1 by electroplating or chemical plating technologies. It should be noted that the metal wiring layer may be formed merely on the upper and lower surfaces or part of sides of one section of magnetic column. The present disclosure is not limited to these.

Figure 9:
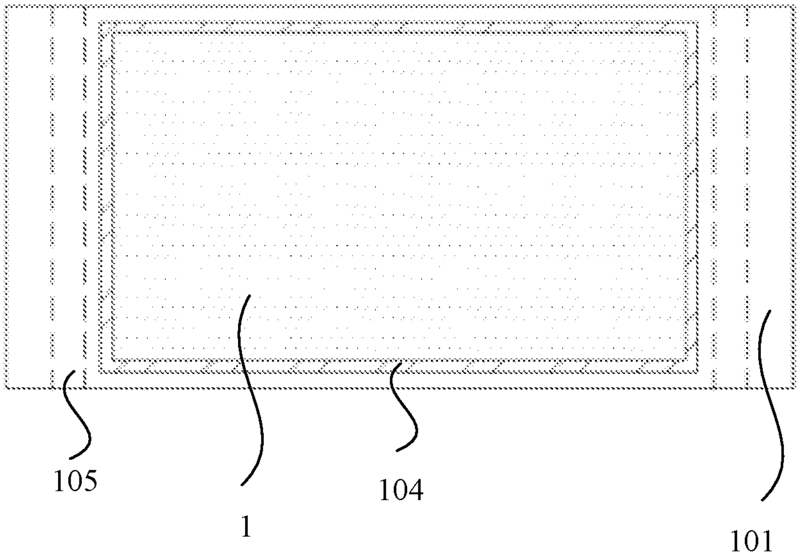
FIG. 9 is a schematic cross-sectional diagram of a structure of an insulation layer and a waist groove according to an embodiment of the present disclosure.
Figure 10:
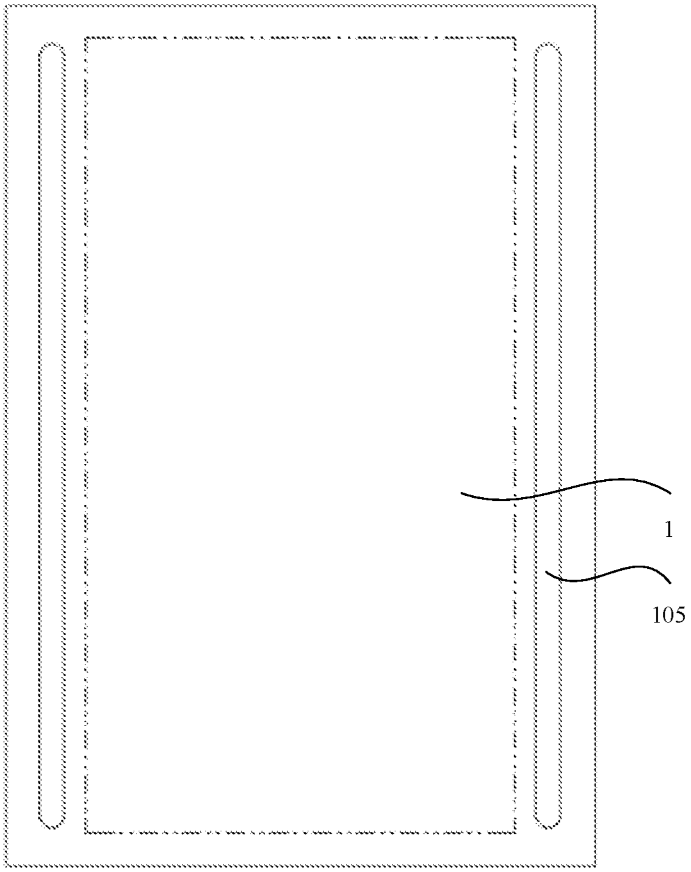
FIG. 10 is a schematic top view of the structure corresponding to FIG. 9.

FIG. 9 is a schematic cross-sectional diagram of a structure of an insulation layer and a waist groove according to an embodiment of the present disclosure. FIG. 10 is a schematic top view of the structure corresponding to FIG. 9. Referring to FIG. 9 and FIG. 10, a possible implementation of forming the metal wiring layer on the outer side of the insulation layer 101 is to form, using a drilling process, a waist groove 105 on the insulation layer 101 in a position away from a side of the magnetic core 1 by a certain distance, on the basis of the structure as shown in FIG. 8. The drilling includes, but is not limited to, mechanical drilling and laser drilling. Subsequently, a surface copper 106 is formed on the upper surface and lower surface of the insulation layer 101, and a first hole copper 107 is formed on the surfaces of the waist groove 105 exposed to the environment using the metallization process.

Figure 11:
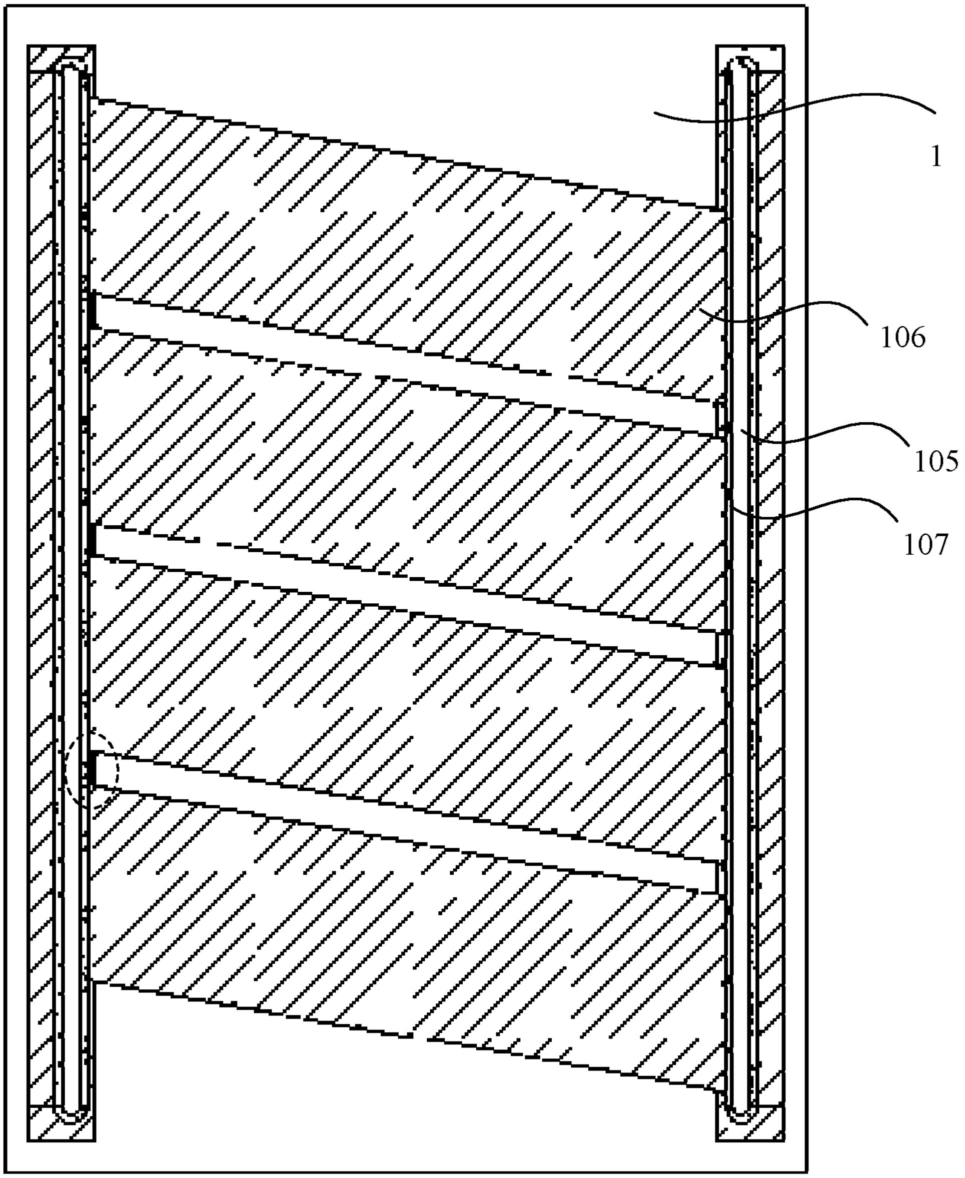
FIG. 11 is a schematic structural diagram of a winding of a horizontal portion according to an embodiment of the present disclosure.

FIG. 11 is a schematic structural diagram of a winding of a horizontal portion according to an embodiment of the present disclosure. Referring to FIG. 11, it is easier to obtain the pattern of the surface copper 106. By taking an additive process as an example, a pre-designed mask which exposes positions where the wiring is needed and covers positions where no wiring is needed is selected, and then the winding of the horizontal portion can be formed through the metallization process.

S103, dividing at least part of the metal wiring layer into a multi-turn metal winding through a mechanically dividing process.

Figure 12:
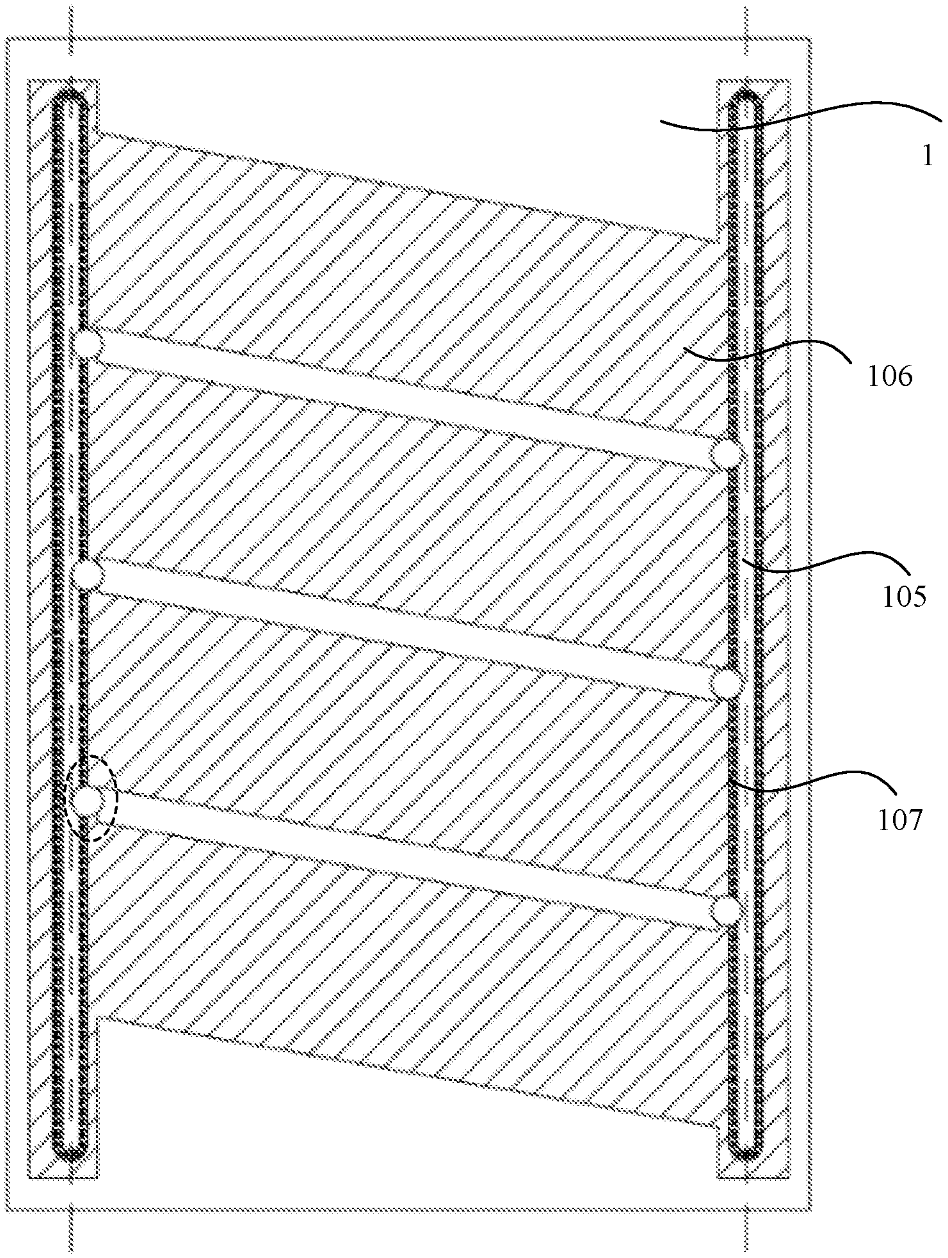
FIG. 12 is a schematic structural diagram of a winding of a vertical portion according to an embodiment of the present disclosure.

FIG. 12 is a schematic structural diagram of a winding of a vertical portion according to an embodiment of the present disclosure. Referring to FIG. 12, a pattern cannot be formed at the position of the waist groove 105 by defining a pattern, such as via a mask, so it is a whole piece of copper that formed on the sidewall of the waist groove 105, and cannot be connected with the surface copper 106 to form a multi-turn metal winding structure flat wound around the magnetic column. On this basis, the mechanically dividing process may be performed to divide the first hole copper 107 into a multi-segment structure in this embodiment. It should be particularly emphasized that, there may be partly connective metal in the area (as indicated by a dotted circle in FIG. 11), which is between the winding patterns of the surface copper 106 and is adjacent to the first hole copper 107, due to dimensional tolerances of the pattern definition, and such partly connective metal is also removed (as indicated by a dotted circle in FIG. 12) during the mechanically dividing. Specifically, the mechanically dividing process includes, but is not limited to, drilling or milling grooves. The first hole copper 107 formed in this way is connected with the surface copper 106 to form the multi-turn metal winding structure. With respect to the copper on the other side of the waist groove 105, i.e. the copper structure on the outer side of the dotted line, may be cut off while separating the board.

According to the magnetic element and the manufacturing method of the magnetic element provided in this embodiment, a multi-turn metal winding structure can be provided on the periphery of the magnetic core through the mechanically dividing process. The manufacturing process is a sophisticated process adopted in mass production, in which a continuous processing is used for convenience of a large-scale production with a relatively low cost.

Embodiment 2

Another magnetic element and another manufacturing method of a magnetic element are introduced in Embodiment 2 of the present disclosure, where the magnetic element includes two metal wiring layers, which is detailed as follows.

Figure 13:
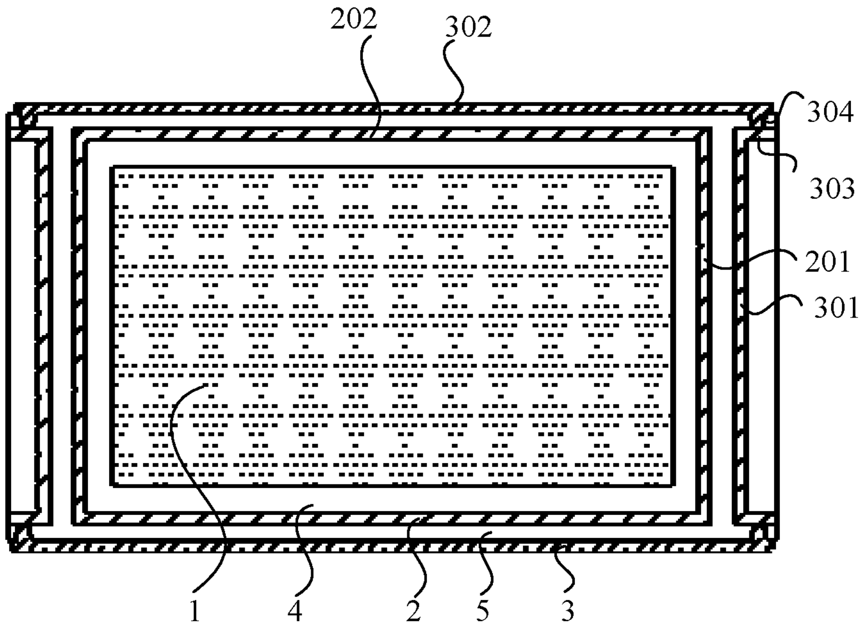
FIG. 13 is a schematic structural diagram of a first magnetic element according to Embodiment 2 of the present disclosure.

FIG. 13 is a schematic structural diagram of a first magnetic element according to Embodiment 2 of the present disclosure. Referring to FIG. 13, in a first feasible implementation, a metal wiring layer includes a first wiring layer 2 and a second wiring layer 3 located outside the first wiring layer 2. A first insulation layer 4 is provided between the magnetic core 1 and the first wiring layer 2, and a second insulation layer 5 is provided between the first wiring layer 2 and the second wiring layer 3. The first wiring layer 2 includes a first vertical portion 201 and a first horizontal portion 202 that are vertically connected, and the second wiring layer 3 includes a second vertical portion 301 and a second horizontal portion 302 that are vertically connected. The second wiring layer 3 further includes a first transitional horizontal portion 303, and the first transitional horizontal portion 303 is coplanar with the first horizontal portion 202; the second vertical portion 301 is vertically connected with the first transitional horizontal portion 303, and the second horizontal portion 302 is connected with the first transitional horizontal portion 303 via a first conductive cylinder 304.

Figure 14:
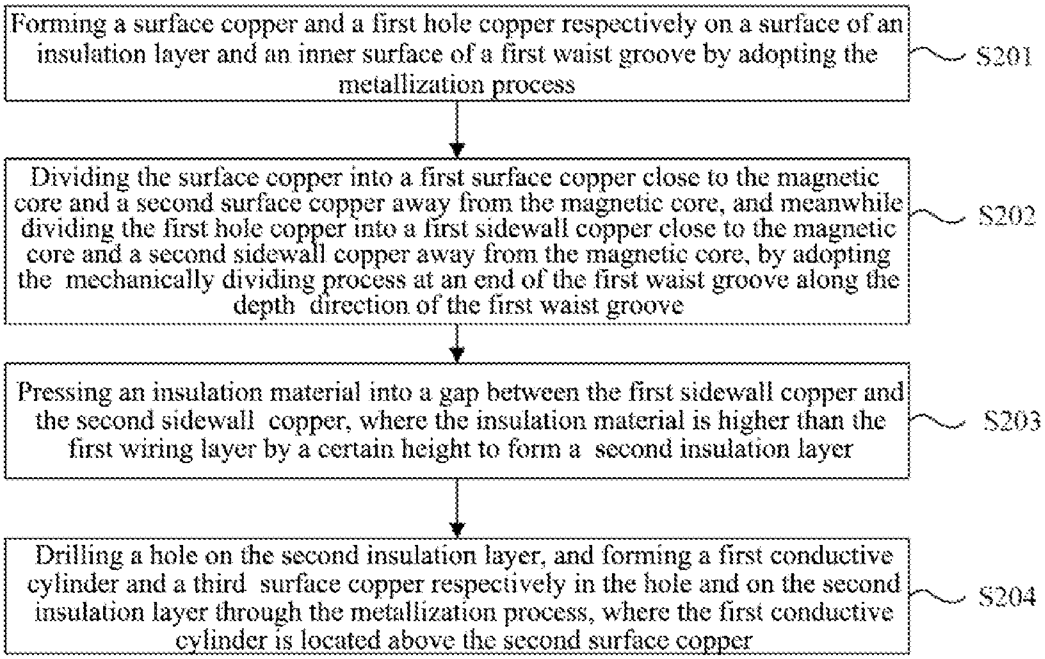
FIG. 14 is a flowchart of a manufacturing method of the first magnetic element according to Embodiment 2 of the present disclosure.

FIG. 14 is a flowchart of a manufacturing method of the first magnetic element according to Embodiment 2 of the present disclosure. Referring to FIG. 14, the manufacturing method of the first magnetic element according to this embodiment includes the following steps.

S201, forming the surface copper 106 and the first hole copper 107 respectively on a surface of the insulation layer 101 and the inner surface of the first waist groove 105 by adopting the metallization process.

Before the implementation of S201, the insulation layer 101 is required to be formed on an outer side of the magnetic core 1 firstly with reference to the description of S101 in Embodiment 1. For the specific implementation of S201, referring to the description of S102 in Embodiment 1, and referring to FIG. 9 and FIG. 10, the waist groove 105 is formed on the insulation layer 101 in a position away from a side of the magnetic core 1 by a certain distance by adopting the drilling process, and the surface copper 106 and the first hole copper 107 are formed on the insulation layer 101 and on a surface of the waist groove 105 exposed to the environment by adopting the metallization process.

S202, at an end of the first waist groove 105 and along the depth direction of the first waist groove 105, removing the remaining part of the surface copper 106 due to the accuracy tolerance of the processing by adopting the mechanically dividing process, to divide the surface copper 106 into a first surface copper close to the magnetic core 1 and a second surface copper away from the magnetic core, and meanwhile dividing the first hole copper 107 into a first sidewall copper close to the magnetic core and a second sidewall copper away from the magnetic core.

Figure 15:
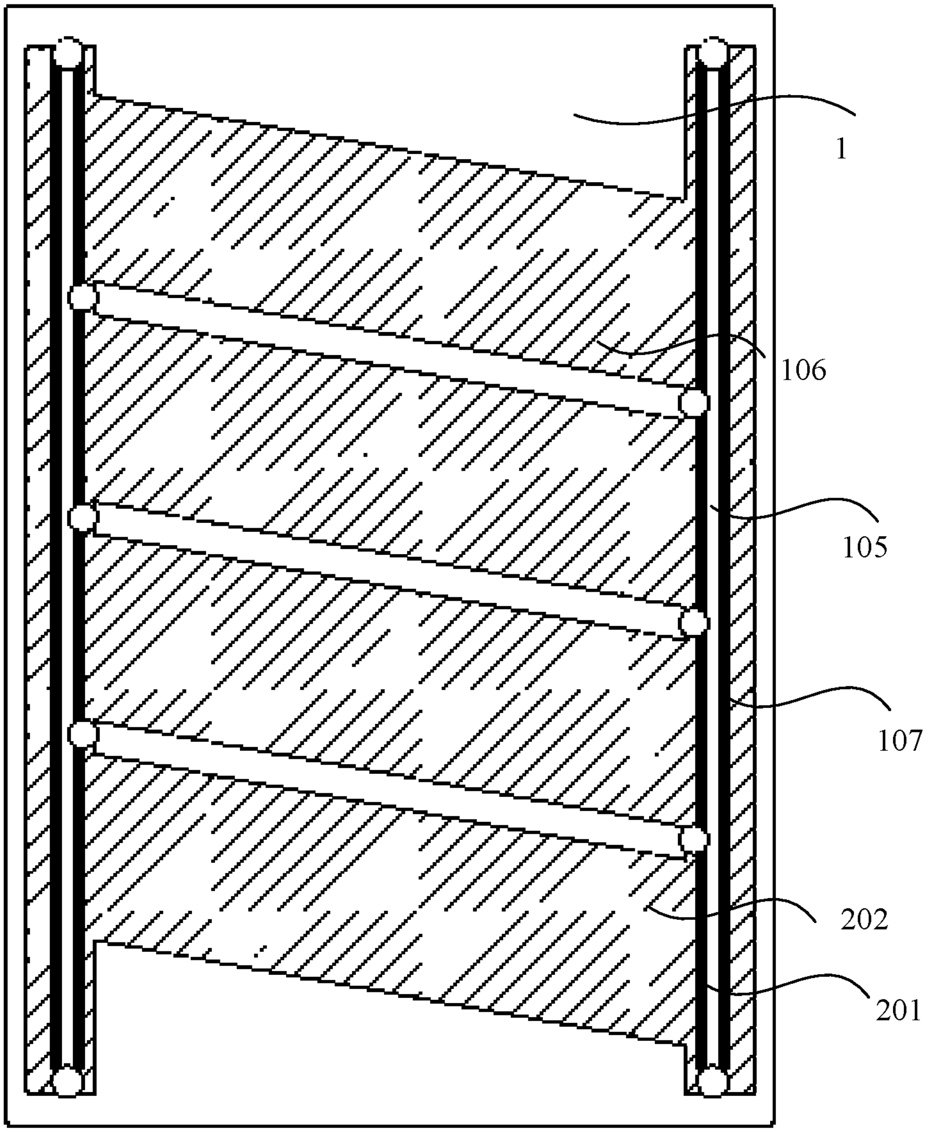
FIG. 15 is a schematic structural diagram 1 of the first magnetic element during the manufacturing process according to Embodiment 2 of the present disclosure.
Figure 16:
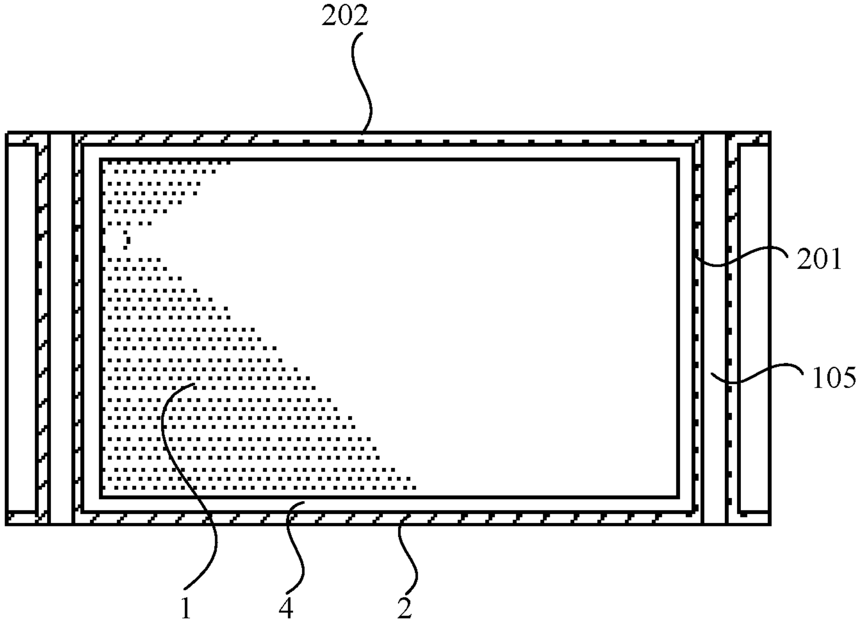
FIG. 16 is a schematic cross-sectional diagram of the structure corresponding to FIG. 15.
Figure 17:
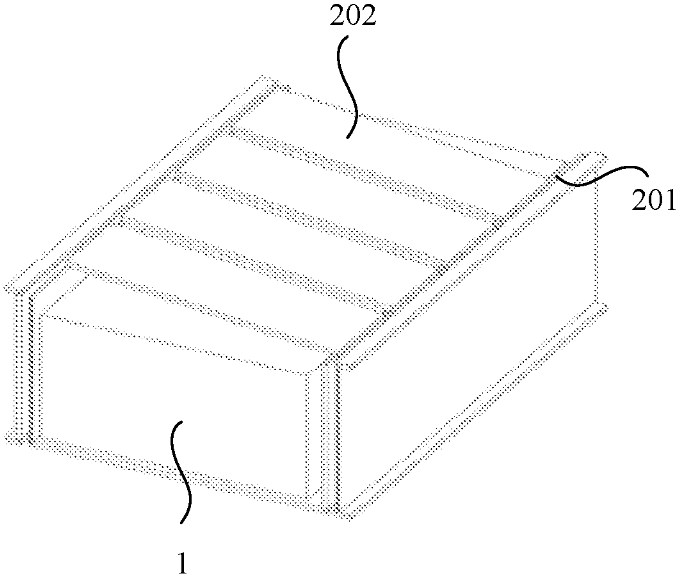
FIG. 17 is a schematic diagram of a three-dimension structure corresponding to FIG. 15.

The first surface copper and the first sidewall copper serve as the first horizontal portion 202 and the first vertical portion 201 respectively and together form the first wiring layer 2 flat wound around the magnetic core 1. An insulation layer between the first wiring layer 2 and the magnetic core 1 is the first insulation layer 4. FIG. 15 is a schematic structural diagram of a magnetic element during the manufacturing process according to Embodiment 2 of the present disclosure. FIG. 16 is a schematic cross-sectional diagram of the structure corresponding to FIG. 15. FIG. 17 is a schematic diagram of a three-dimensional structure corresponding to FIG. 15 (the insulation layer is not shown in the schematic diagram of the three-dimensional structure).

Referring to FIG. 15 to FIG. 17, since the first hole copper 107 is divided into at least two independent parts after going through the dividing process, i.e. by taking the central axis of the first waist groove 105 as a boundary, the first sidewall copper located on the side close to the magnetic core 1 is connected with the first surface copper to form a closed loop wound around the magnetic core 1 and form the first wiring layer 2 flat wound around the magnetic core 1. The first surface copper and the first sidewall copper serve as the first horizontal portion 202 and the first vertical portion 201 respectively.

S203, pressing an insulation material into a gap between the first sidewall copper and the second sidewall copper, where the insulation material is higher than the first wiring layer 2 by a certain height to form the second insulation layer 5.

S204, drilling a hole on the second insulation layer 5, and forming a first conductive cylinder and a third surface copper respectively in the hole and on the second insulation layer through the metallization process, where the first conductive cylinder 304 is located above the second surface copper.

Continuing to refer to FIG. 13, the third surface copper, the second surface copper and the second sidewall copper serve as the second horizontal portion 302, the first transitional horizontal portion 303 and the second vertical portion 301 respectively and form the second wiring layer 3 flat wound around the magnetic core 1 together with the first conductive cylinder 304. Thereby the first sidewall copper and the second sidewall copper of the same waist groove belong to the first wiring layer 2 and the second wiring layer 3 respectively, which can greatly save the space and increase the power density of the module, compared with forming vertical connection portions of the first wiring layer 2 and the second wiring layer 3 respectively via independent holes or waist grooves.

Figure 18:
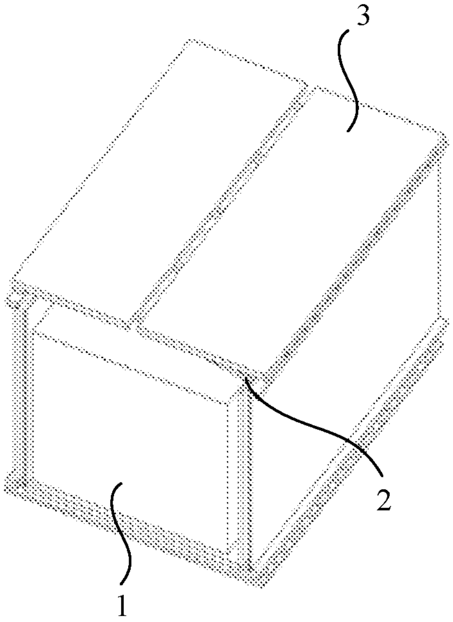
FIG. 18 is schematic diagram 1 of a three-dimensional structure of a magnetic element according to Embodiment 2 of the present disclosure.
Figure 19:
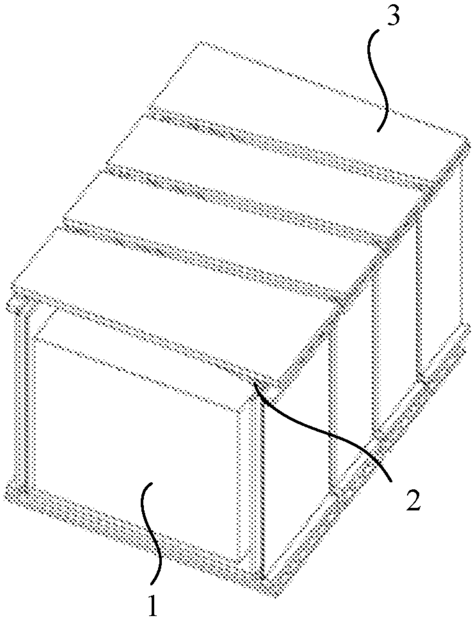
FIG. 19 is schematic diagram 2 of a three-dimensional structure of a magnetic element according to Embodiment 2 of the present disclosure.

Optionally, the first wiring layer 2 may be a single-turn wiring layer or a multi-turn wiring layer, and the second wiring layer 3 may be a single-turn wiring layer or a multi-turn wiring layer. FIG. 18 is a schematic diagram 1 of a three-dimensional structure of a magnetic element according to Embodiment 2 of the present disclosure. Referring to FIG. 18, a multi-turn metal winding may be provided on the first wiring layer 2, while the second wiring layer 3 has a single-turn metal winding structure. FIG. 19 is a schematic diagram 2 of a three-dimensional structure of a magnetic element according to Embodiment 2 of the present disclosure. Referring to FIG. 19, both of the first wiring layer 2 and the second wiring layer 3 have the multi-turn metal winding structure. The description of S103 in Embodiment 1 may be referred to for the manner of forming the second wiring layer 3 with the multi-turn metal winding structure.

Figure 20:
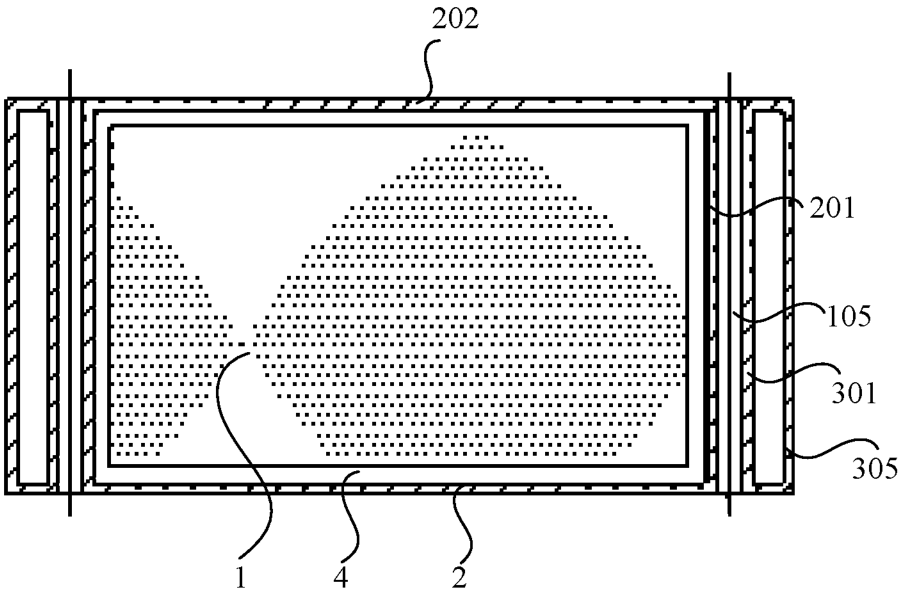
FIG. 20 is another schematic structural diagram of a first wiring layer according to Embodiment 2 of the present disclosure.

FIG. 20 is still another schematic structural diagram of a first wiring layer according to Embodiment 2 of the present disclosure. Optionally, if a relatively large current is required, a connection path between the upper surface copper and lower surface copper may also be increased according to the structure as shown in FIG. 20, i.e. the current-flow area is increased, and then the loss will be reduced and the efficiency will be improved. For the structure as shown in FIG. 20, since a continuous processing is adopted in an practical manufacturing process, it is only needed to provide one waist groove between two units and then form a hole copper in the waist groove by adopting the metallization process, thereby a sidewall copper on an outer edge, i.e. a first additional vertical portion 305, can be obtained after separating the panel board, wherein the unit includes the magnetic core and the metal winding wound thereon.

It should be specifically noted that the aforementioned insulation layers, such as the first insulation layer 4 and the second insulating layer 5, are not specified as a singular insulation layer, but may have a structure of a composite layer. For example, the second insulation layer 5 may include a parylene layer deposited by a CVD process and an epoxy layer, where the former can provide a safe and reliable insulation function with a relatively thin thickness due to its high voltage resistance, fine structure and no defects, and the latter provides functions of caulking, surface smoothing and auxiliary insulation.

In the manufacturing method of the magnetic element according to the embodiment of the present disclosure, the upper surface and lower surface and two opposite sides of the magnetic core are coated with an insulation material by adopting an embedding process or a molding process; the waist groove is formed in the position relatively close to the magnetic core by drilling PCB or by other mechanical methods, for example, forming a waist groove with the width of 400 μm in a position 200 μm away from the sidewall of the magnetic core, in which case the thickness of the surface copper and the hole copper formed through the metallization process may be up to 70 μm. Then the hole copper in the position of the waist groove is divided into two sidewall coppers through the mechanically dividing process, and these two sidewall coppers constitute a part of the first wiring layer and a part of the second wiring layer respectively. By dividing the hole copper of the waist groove into two parts of sidewall coppers which belong to the first wiring layer and the second wiring layer respectively, the footprint of the transformer can be effectively reduced, compared with the manner of two independent holes which belong to the first wiring layer and the second wiring layer respectively.

Further, in this embodiment, the metal wiring layer has at least a first metal winding and a second metal winding formed thereon; at least part of the first metal winding is formed on the first wiring layer 2, and at least part of the second metal winding is formed on the second wiring layer 3; at least part of the first metal winding is covered by the second insulation layer 5, and at least part of the first metal winding is covered by the second metal winding; and at least part of the second insulation layer 5 is covered by the second metal winding. For example, the magnetic element can be used as a transformer, and the two metal wiring layers form a primary winding and a secondary winding of the transformer. The first wiring layer 2 forms the primary winding, and the second wiring layer 3 forms the secondary winding; or, a part of the first wiring layer 2 and a part of the second wiring layer 3 form the primary winding, and the other part of the first wiring layer 2 and the other part of the second wiring layer 3 form the secondary winding.

In terms of electrical characteristics, since the distances of the formed metal winding to the same surface of the magnetic core 1 are almost equal, i.e. the equivalent diameters of all parts of the winding that has a flat wound structure are close, the equivalent impedances thereof are close, which realizes an even distribution of the current in the metal winding.

Embodiment 3

Embodiment 3 of the present disclosure introduces a magnetic element and a manufacturing method of a magnetic element, where the magnetic element includes three metal wiring layers, which is detailed as follows.

Figure 21:
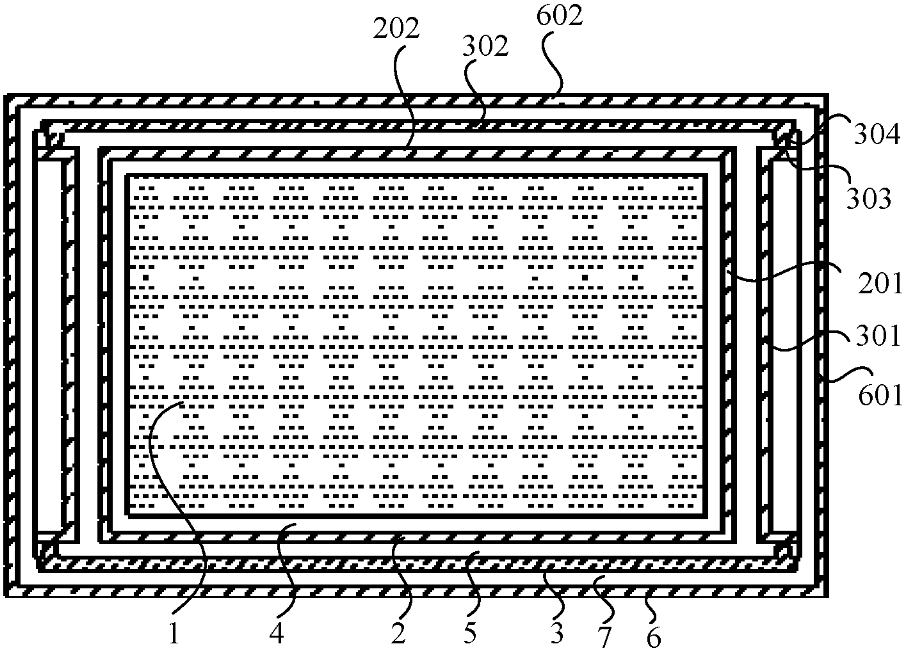
FIG. 21 is a schematic structural diagram of a second magnetic element according to Embodiment 3 of the present disclosure.

FIG. 21 is a schematic structural diagram of a second magnetic element according to Embodiment 3 of the present disclosure. Referring to FIG. 21, the metal wiring layer further includes a third wiring layer 6 located outside the second wiring layer 3, and a third insulation layer 7 is provided between the second wiring layer 3 and the third wiring layers 6; the third wiring layer 6 includes a third vertical portion 601 and a third horizontal portion 602 that are vertically connected.

Figure 22:
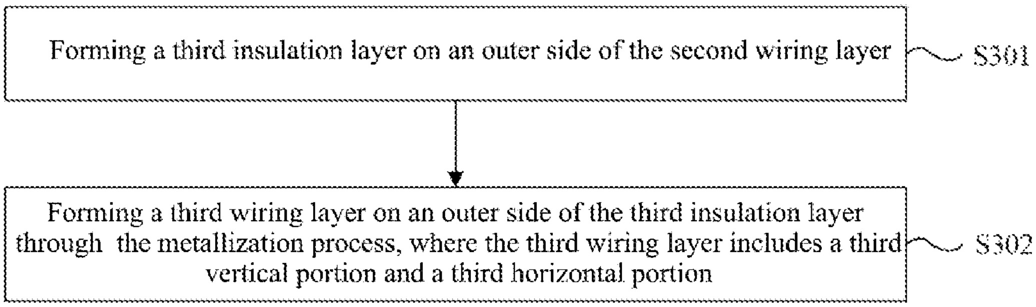
FIG. 22 is a flowchart of a manufacturing method of the second magnetic element according to Embodiment 3 of the present disclosure.

FIG. 22 is a flowchart of a manufacturing method of the second magnetic element according to Embodiment 3 of the present disclosure. Referring to FIG. 22, the manufacturing method of the second magnetic element includes the following steps.

S301, forming the third insulation layer 7 on an outer side of the second wiring layer 3.

S302, forming the third wiring layer 6 on an outer side of the third insulation layer 7 through the metallization process, where the third wiring layer includes the third vertical portion 601 and the third horizontal portion 602.

The aforementioned steps are the processes that are carried out on the basis of the completion of S204 of Embodiment 2. Based on FIG. 13, the third insulation layer 7 is formed on the outer side of the second wiring layer 3, where the insulation layer 101 may be referred to for the characteristics of the third insulation layer 7, which is not repeated here.

Figure 23:
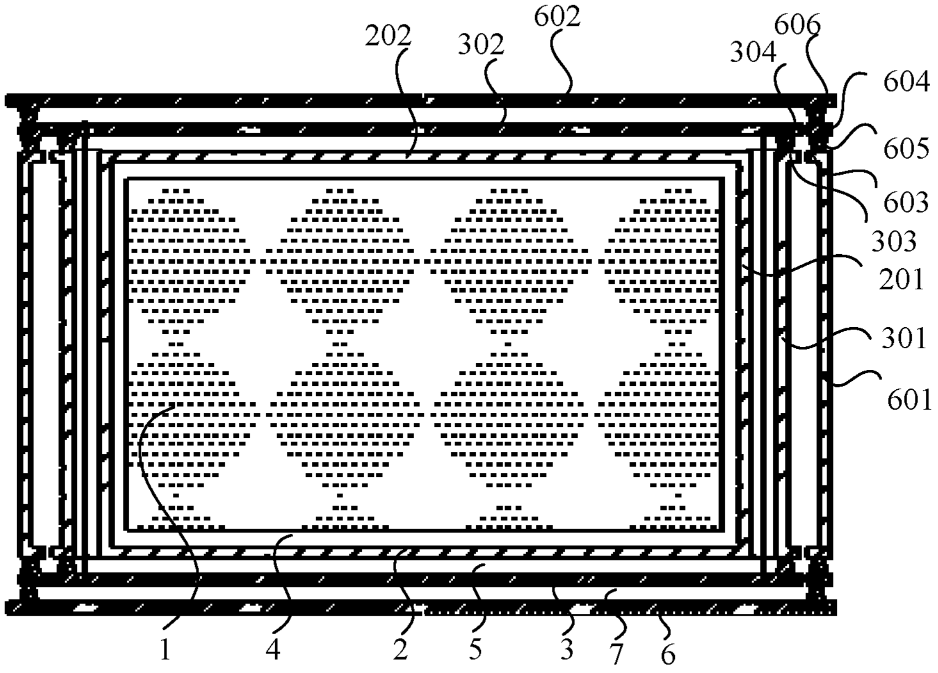
FIG. 23 is a schematic structural diagram of a third magnetic element according to Embodiment 3 of the present disclosure.

FIG. 23 is a schematic structural diagram of a third magnetic element according to Embodiment 3 of the present disclosure. Referring to FIG. 23, the metal wiring layer includes the third wiring layer 6 located outside the second wiring layer 3, and the third insulation layer 7 is provided between the second wiring layer 3 and the third wiring layers 6; and the third wiring layer 6 includes the third vertical portion 601 and the third horizontal portion 602 that are vertically connected. The third wiring layer 6 further includes: a second transitional horizontal portion 603 and a third transitional horizontal portion 604; where the second transitional horizontal portion 603 is coplanar with the first horizontal portion 202, and the third transitional horizontal portion 604 is coplanar with the second horizontal portion 302; the third vertical portion 601 is vertically connected with the second transitional horizontal portion 603; the second transitional horizontal portion 603 is connected with the third transitional horizontal portion 604 via a second conductive cylinder 605, and the third transitional horizontal portion 604 is connected with the third horizontal portion 602 via a third conductive cylinder 606.

Figure 24:
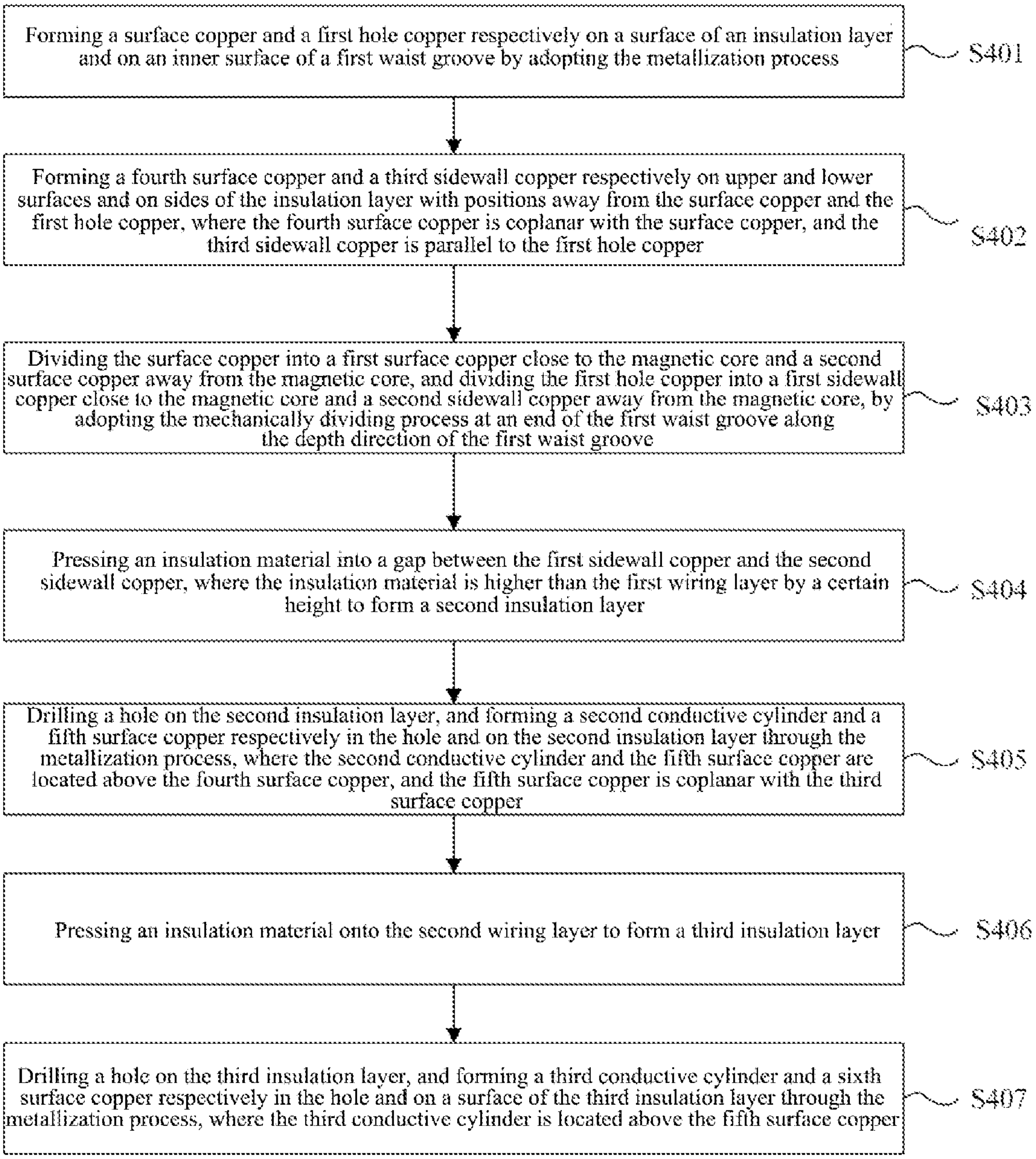
FIG. 24 is a flowchart of a manufacturing method of the third magnetic element according to Embodiment 3 of the present disclosure.

FIG. 24 is a flowchart of a manufacturing method of the third magnetic element according to Embodiment 3 of the present disclosure. Referring to FIG. 24, the manufacturing method of the third magnetic element includes the following steps.

S401, forming the surface copper 106 and the first hole copper 107 respectively on the surface of the insulation layer 101 and on the inner surface of the first waist groove 105 by adopting the metallization process, which is the same as S201 and is not repeated here.

S402, forming a fourth surface copper and a third sidewall copper respectively on upper and lower surfaces and on sides of the insulation layer 101 with positions away from the surface copper 106 and the first hole copper 107, where the fourth surface copper is coplanar with the surface copper 106, and the third sidewall copper is parallel to the first hole copper 107.

Figure 25:
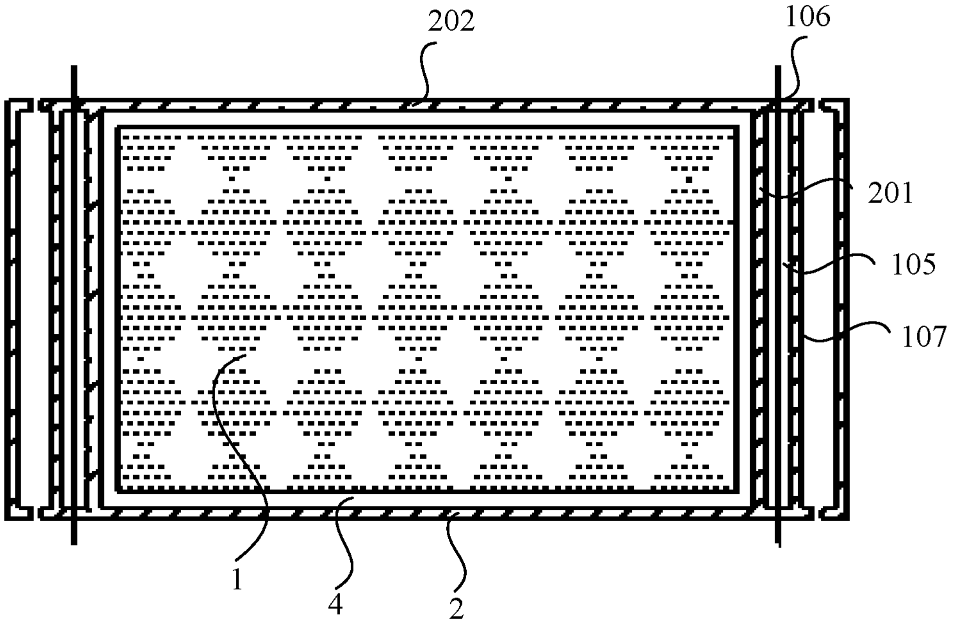
FIG. 25 is a schematic structural diagram 1 of the third magnetic element during the manufacturing process according to Embodiment 3 of the present disclosure.

FIG. 25 is a schematic structural diagram 1 of the third magnetic element during the manufacturing process according to Embodiment 3 of the present disclosure. The positions of the fourth surface copper and the third sidewall copper may be understood by referring to FIG. 25.

S403, dividing the surface copper 106 into a first surface copper close to the magnetic core 1 and a second surface copper away from the magnetic core 1, and dividing the first hole copper 107 into a first sidewall copper close to the magnetic core and a second sidewall copper away from the magnetic core, by adopting the mechanically dividing process at an end of the first waist groove 105 along the depth direction of the first waist groove 105.

Figure 26:
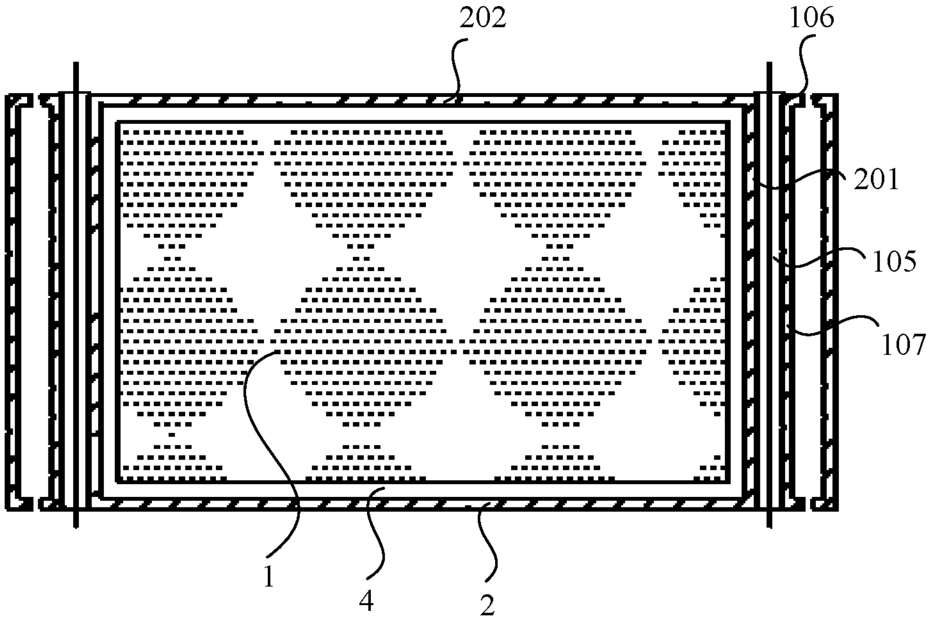
FIG. 26 is a schematic structural diagram 2 of the third magnetic element during the manufacturing process according to Embodiment 3 of the present disclosure.

FIG. 26 is a schematic structural diagram 2 of the third magnetic element during the manufacturing process according to an embodiment of the present disclosure. Referring to FIG. 26, the specific process of S403 is the same as S202, which is not repeated here.

S404, pressing an insulation material into a gap between the first sidewall copper and the second sidewall copper, where the insulation material is higher than the first wiring layer 2 by a certain height to form the second insulation layer 5, which is the same as S203 and is not repeated here.

S405, drilling a hole on the second insulation layer 5, and forming a first conductive cylinder and a third surface copper respectively in the hole and on the second insulation layer through the metallization process, where the first conductive cylinder 304 is located above the second surface copper, which is the same as S204 and is not repeated here. The third surface copper, the second surface copper and the second sidewall copper serve as the second horizontal portion 302, the first transitional horizontal portion 303 and the second vertical portion 301 respectively and form the second wiring layer 3 flat wound around the magnetic core 1 together with the first conductive cylinder 304. And drilling a hole on the second insulation layer 5, and forming the second conductive cylinder 605 and a fifth surface copper respectively in the hole and on the second insulation layer through the metallization process, where the second conductive cylinder 605 and the fifth surface copper are located above the fourth surface copper, and the fifth surface copper is coplanar with the third surface copper.

S406, pressing the insulation material onto the second wiring layer 3 to form the third insulation layer 7.

S407, drilling a hole on the third insulation layer 7, and forming the third conductive cylinder 606 and a sixth surface copper respectively in the hole and on the surface of the third insulation layer 7 through the metallization process, where the third conductive cylinder 606 is located above the fifth surface copper.

The third sidewall copper, the fourth surface copper, the fifth surface copper and the sixth surface copper serve as the third vertical portion 601, the second transitional horizontal portion 603, the third transitional horizontal portion 604 and the third horizontal portion 602 respectively, and form the third wiring layer 6 flat wound around the magnetic core 1 together with the second conductive cylinder 605 and the third conductive cylinder 606.

Figure 27:
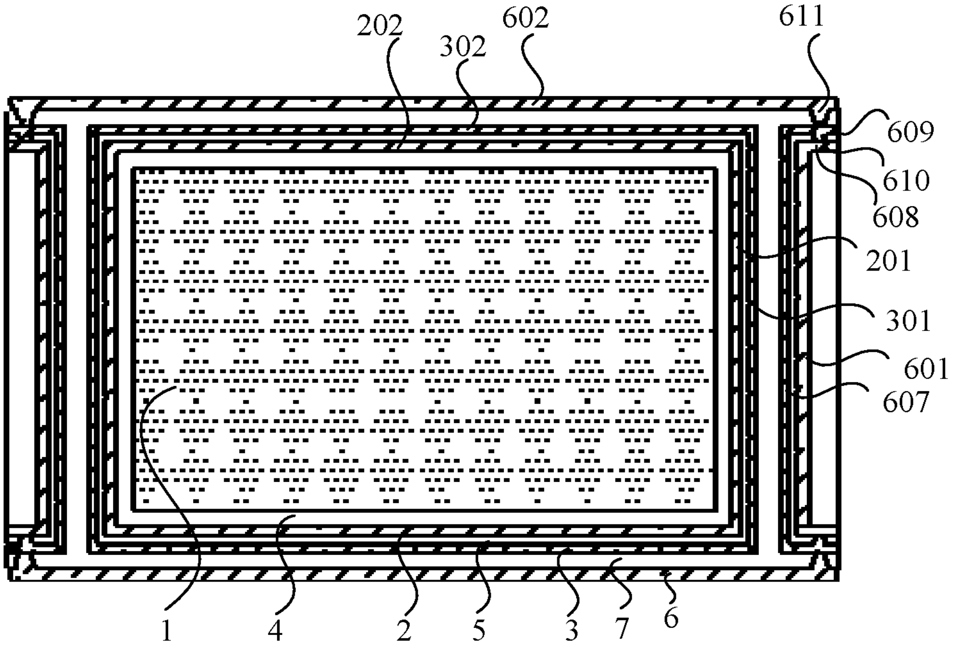
FIG. 27 is a schematic structural diagram of a fourth magnetic element according to Embodiment 3 of the present disclosure.

FIG. 27 is a schematic structural diagram of a fourth magnetic element according to Embodiment 3 of the present disclosure. Referring to FIG. 27, the metal wiring layer further includes the third wiring layer 6 located outside the second wiring layer 3, and the third insulation layer 7 is provided between the second wiring layer 3 and the third wiring layer 6; and the third wiring layer 6 includes the third vertical portion 601 and the third horizontal portion 602 that are vertically connected. The third wiring layer 6 further includes: a second additional vertical portion 607, a fourth transitional horizontal portion 608 and a fifth transitional horizontal portion 609; the fourth transitional horizontal portion 608 is coplanar with the first horizontal portion 202, and the fifth transitional horizontal portion 609 is coplanar with the second horizontal portion 302; the third vertical portion 601 is vertically connected the fourth transitional horizontal portion 608, and the fourth transitional horizontal portion 608 is connected with the fifth transitional horizontal portion 609 via a fourth conductive cylinder 610; the second additional vertical portion 607 is vertically connected with the fifth transitional horizontal portion 609, and the fifth transitional horizontal portion 609 is connected with the third horizontal portion 602 via a fifth conductive cylinder 611.

Figure 28:
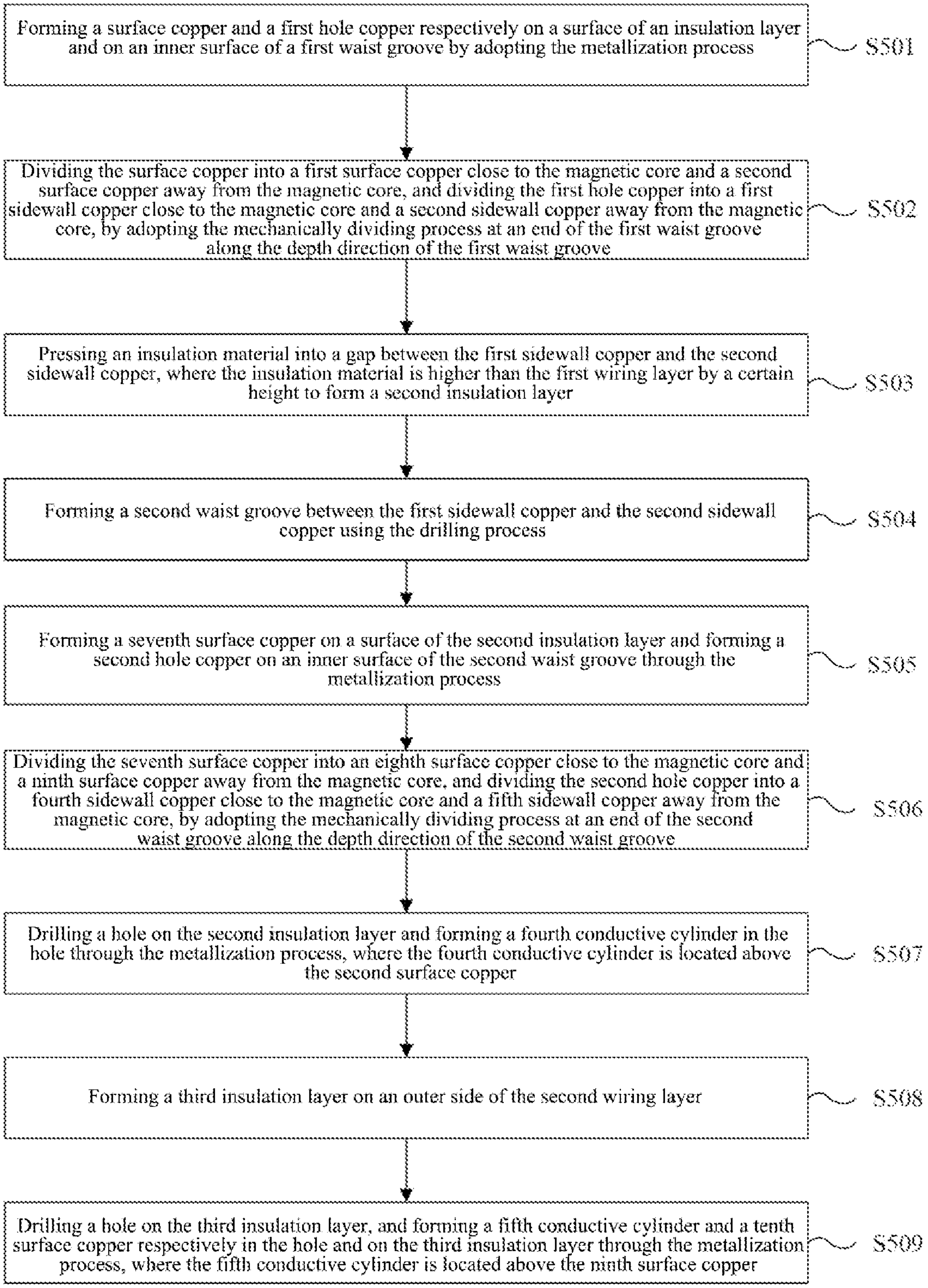
FIG. 28 is a flowchart of a manufacturing method of the fourth magnetic element according to Embodiment 3 of the present disclosure.

FIG. 28 is a flowchart of a manufacturing method of the fourth magnetic element according to Embodiment 3 of the present disclosure. Referring to FIG. 28, the manufacturing method of the fourth magnetic element includes the following steps.

S501, forming the surface copper 106 and the first hole copper 107 respectively on the surface of the insulation layer 101 and on the inner surface of the first waist groove 105 by adopting the metallization process, which is the same as S201 and is not repeated here.

S502, dividing the surface copper 106 into the first surface copper close to the magnetic core 1 and the second surface copper away from the magnetic core 1, and dividing the first hole copper 107 into the first sidewall copper close to the magnetic core 1 and the second sidewall copper away from the magnetic core 1, by adopting the mechanically dividing process at an end of the first waist groove 105 along the depth direction of the first waist groove 105, which is the same as S202 and is not repeated here.

S503, pressing the insulation material into the gap between the first sidewall copper and the second sidewall copper, where the insulation material is higher than the first wiring layer 2 by a certain height to form the second insulation layer 5.

S504, forming a second waist groove between the first sidewall copper and the second sidewall copper by adopting the drilling process.

S505, forming a seventh surface copper on a surface of the second insulation layer 5 and forming a second hole copper on an inner surface of the second waist groove through the metallization process.

S506, dividing the seventh surface copper into an eighth surface copper close to the magnetic core 1 and a ninth surface copper away from the magnetic core 1, and dividing the second hole copper into a fourth sidewall copper close to the magnetic core and a fifth sidewall copper away from the magnetic core, by adopting the mechanically dividing process at an end of the second waist groove along the depth direction of the second waist groove.

S507, drilling a hole on the second insulation layer 5 and forming the fourth conductive cylinder 610 in the hole through the metallization process, where the fourth conductive cylinder 610 is located above the second surface copper.

The eighth surface copper and the fourth sidewall copper serve as the second horizontal portion 302 and the second vertical portion 301 respectively, and together form the second wiring layer 3 flat wound around the magnetic core 1.

S508, forming the third insulation layer 7 on the outer side of the second wiring layer 3.

S509, drilling a hole on the third insulation layer 7, and forming the fifth conductive cylinder 611 and a tenth surface copper respectively in the hole and on the third insulation layer 7 through the metallization process, where the fifth conductive cylinder 611 is located above the ninth surface copper.

The second sidewall copper, the second surface copper, the fifth sidewall copper, the ninth surface copper and the tenth surface copper serve as the third vertical portion 601, the fourth transitional horizontal portion 608, the second additional vertical portion 607, the fifth transitional horizontal portion 609 and the third horizontal portion 602 respectively, and form the third wiring layer 6 flat wound around the magnetic core 1 together with the fourth conductive cylinder 610 and the fifth conductive cylinder 611.

Figure 29:
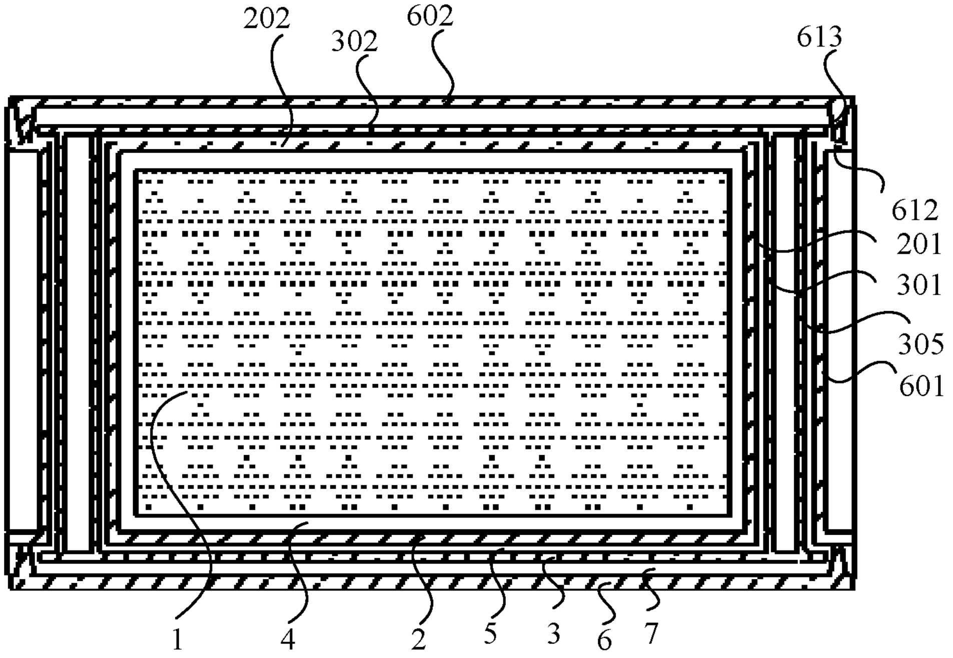
FIG. 29 is a schematic structural diagram of a fifth magnetic element according to Embodiment 3 of the present disclosure.

FIG. 29 is a schematic structural diagram of a fifth magnetic element according to Embodiment 3 of the present disclosure. Referring to FIG. 29, the metal wiring layer further includes the third wiring layer 6 located outside the second wiring layer 3, and the third insulation layer 7 is provided between the second wiring layer 3 and the third the wiring layers 6; and the third wiring layer 6 includes the third vertical portion 601 and the third horizontal portion 602 that are vertically connected. The third wiring layer 6 further includes: a sixth transitional horizontal portion 612; where the sixth transitional horizontal portion 612 is coplanar with the first horizontal portion 202; the third vertical portion 601 is vertically connected with the sixth transitional horizontal portion 612, and the sixth transitional horizontal portion 612 is connected with the third horizontal portion 602 via a sixth conductive cylinder 613.

Figure 30:
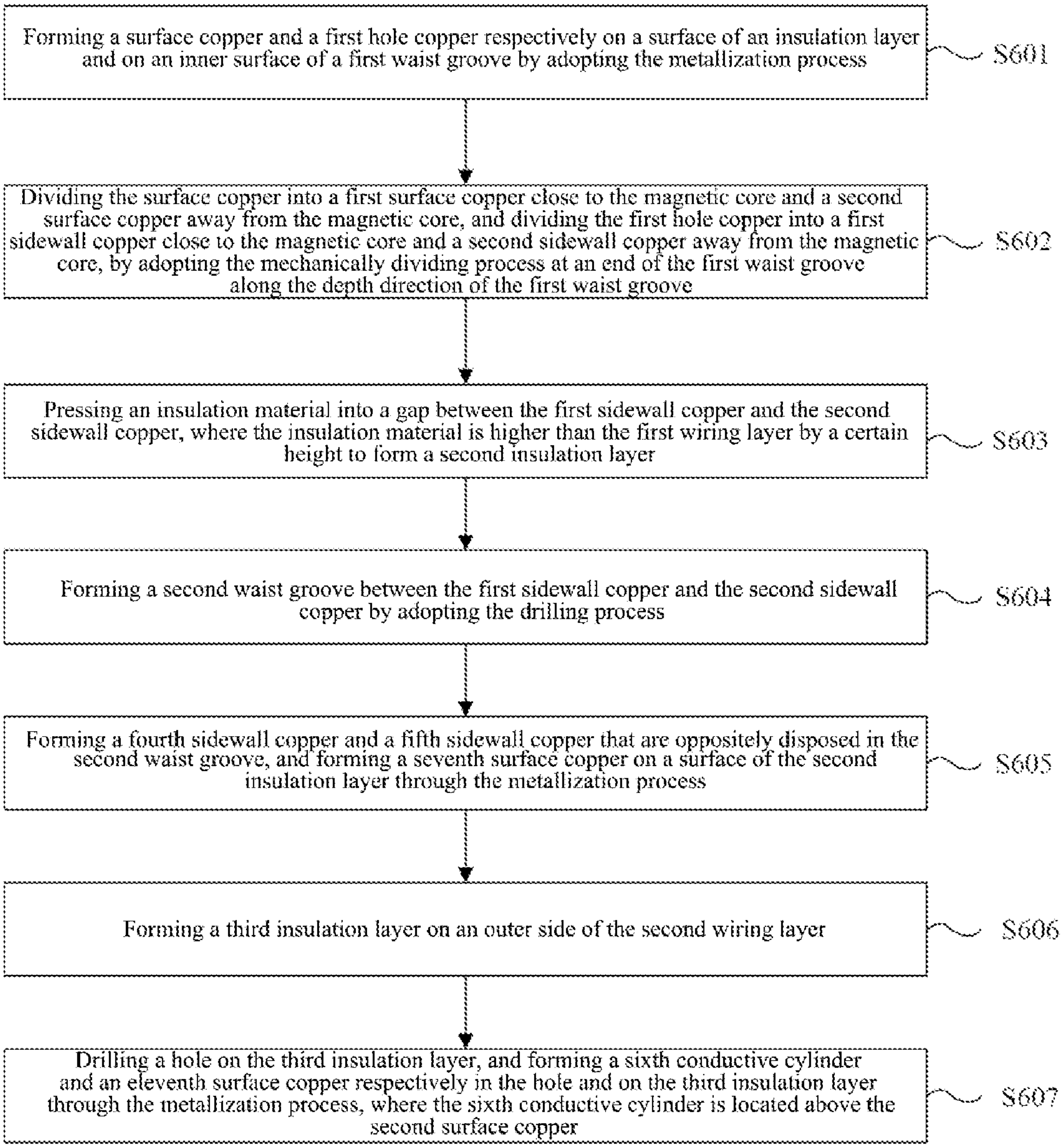
FIG. 30 is a flowchart of a manufacturing method of the fifth magnetic element according to Embodiment 3 of the present disclosure.

FIG. 30 is a flowchart of a manufacturing method of the fifth magnetic element according to Embodiment 3 of the present disclosure. Referring to FIG. 30, the manufacturing method of the fifth magnetic element includes the following steps.

S601, forming the surface copper 106 and the first hole copper 107 respectively on the surface of the insulation layer 101 and on the inner surface of the first waist groove 105 by adopting the metallization process.

S602, dividing the surface copper 106 into the first surface copper close to the magnetic core 1 and the second surface copper away from the magnetic core 1, and dividing the first hole copper 107 into the first sidewall copper close to the magnetic core and the second sidewall copper away from the magnetic core 1, by adopting the mechanically dividing process at an end of the first waist groove 105 along the depth direction of the first waist groove 105.

S603, pressing the insulation material into the gap between the first sidewall copper and the second sidewall copper, where the insulation material is higher than the first wiring layer 2 by a certain height to form the second insulation layer 5.

S604, forming a second waist groove between the first sidewall copper and the second sidewall copper by adopting the drilling process.

S605, forming the fourth sidewall copper and the fifth sidewall copper that are oppositely disposed in the second waist groove, and forming the seventh surface copper on the surface of the second insulation layer 5 through the metallization process.

The seventh surface copper and the second hole copper serve as the second horizontal portion 302 and the second vertical portion 301 respectively, and together form the second wiring layer 3 flat wound around the magnetic core 1. S601 to S605 are the same as S501 to S505, which are not repeated here.

S606, forming the third insulation layer 7 on the outer side of the second wiring layer 3.

S607, drilling a hole on the third insulation layer 7, and forming the sixth conductive cylinder 613 and an eleventh surface copper respectively in the hole and on the third insulation layer 7 through the metallization process, where the sixth conductive cylinder 613 is located above the second surface copper.

The second sidewall copper, the second surface copper and the eleventh surface copper serve as the third vertical portion 601, the sixth transitional horizontal portion 612 and the third horizontal portion 602 respectively, and form the third wiring layer 6 flat wound around the magnetic core 1 together with the sixth conductive cylinder 613.

FIG. 31 is a schematic structural diagram of a sixth magnetic element according to Embodiment 3 of the present disclosure. Referring to FIG. 31, in another possible structure, the first wiring layer 2, the second wiring layer 3 and the third wiring layer 6 are provided respectively to the magnetic core 1 from the inside to the outside. The first wiring layer 2 includes the first vertical portion 201 and the first horizontal portion 202 that are vertically connected; the second wiring layer 3 includes the second vertical portion 301 and the second horizontal portion 302 that are vertically connected; and the third wiring layer 6 includes the third vertical portion 601 and the third horizontal portion 602 that are vertically connected, and a seventh transitional horizontal portion 614 and a seventh conductive cylinder 615. The seventh transitional horizontal portion 614 is coplanar with the second horizontal portion 302, and the third vertical portion 601 is vertically connected with the seventh transitional horizontal portion 614; the seventh transitional horizontal portion 614 is connected with the third horizontal portion 602 via the seventh conductive cylinder 615, and the seventh transitional horizontal portion 614 is disposed on one side of the third vertical portion 601 that is away from the second vertical portion 301.

Considering the influence of the subsequent process on the embedded magnetic core, for example, pressing stress generated by the electroplating stress to the magnetic core and thermal stress caused by mismatch of the coefficient of thermal expansion (CTE), these stresses will lead to an increase in magnetic loss. Therefore, in order to avoid a relatively large stress generated between metallic coppers and the magnetic core, a thin transitional layer 104 may be provided between the magnetic core and the first wiring layer. The transitional layer not only plays a role in stress relief, but also has benefits of providing insulation function and protecting the magnetic core, the details may be referred to Embodiment 1.

The first wiring layer 2 is obtained by laser etching, and the manufacturing methods of the second wiring layer 3 and the third wiring layer 6 may be understood by referring to Embodiment 2.

The first wiring layer 2 is obtained by laser etching, which specifically includes the following steps.

In the first step, forming the first wiring layer 2 on the first insulation layer through the metallization process.

In the second step, forming a first protective layer on the first wiring layer 2. Specifically, a first protective layer composed of tin, tin alloy, gold or gold alloy may be formed on the first wiring layer 2 through electroplating or chemical plating technologies.

The advantage of using tin as a protective layer is that its cost is low, the reaction rate in a strong oxidizing solvent is extremely slow, and the protective effect is excellent. In addition, in this embodiment, processes like electroplating or chemical plating are selected to provide the first protective layer instead of using other non-metallic materials like traditional photoresist materials. The main reason is that the pattern definition of the photoresist material is implemented through the exposure and development process, and at present, generally an exposure machine can only be operated under the same plane; while for structures in this embodiment, it is also needed to perform the pattern definition on sidewalls within the window to form windings wound around the magnetic core, therefore, the exposure and development process is not suitable.

Furthermore, compared with ordinary organic materials, the first protective layer has the following advantages. Firstly, it is difficult to uniformly coat photoresist materials such as organic materials, and an uneven thickness may occur especially at corners and other positions, which results in a low consistency of the process. The metal coating is adopted as the metal protective layer for its excellent surface conformal capability by electroplating or chemical plating. Secondly, in case of using an organic material as the protective layer, a solution etching process is generally used for etching the metal of the first wiring layer 2, and after complementing the etch of the metal wiring layer, such as the copper layer, there are some gaps under the organic material due to the isotropy of the solution etching process. When subsequent process such as spraying the insulation layer is performed with the organic material retained, there are some shadows and shadowing effects in the gaps under the organic layer, which leads to a poor processability, such as generating bubbles. Besides, it is difficult to remove the integral organic material due to pollution of the organic solution, long process time, difficulties in cleaning the surface and the like. In conclusion, processes such as electroplating and chemical plating may be selected in this embodiment to provide the first protective layer.

In addition, in a possible implementation, the thickness of the first protective layer may be adjusted according to different protective abilities of different metals. For example, if the material of the first protective layer is tin or tin alloy, the thickness of the first protective layer ranges from 1 to 20 μm; or, if the material of the first protective layer is gold or gold alloy, the thickness of the first protective layer ranges from 0.1 to 2 μm.

In the third step, removing part of the first protective layer through a direct writing technology to expose part of the first wiring layer 2. Specifically, a pattern definition is performed for a surface of the first protective layer 21 through the direct writing technology to expose part of the first wiring layer 2, i.e. exposing the wiring layer metal that needs to be etched.

In a possible implementation, the direct writing technology may be a laser direct writing technology. The so-called direct writing technology, compared with the traditional photolithography process under the protection of masking, has a characteristic of directly performing the pattern definition using a focused light beam, an electron beam, an ion beam or the like. By adopting the direct writing technology, serialization products can be produced according to different application requirements due to its flexible production without masking, thereby significantly shortening the time for bringing products to the market. In addition, since the direct writing technology is adopted, a position of a sample can be accurately located and a surface state of the sample can be accurately obtained through an optical recognition technology before performing the direct writing, and based on this, a direct writing path of each sample can be optimized to increase the yield and lower the requirements for the previous manufacturing process, thereby improving the competitiveness of the products. Besides, since the first protective layer is provided above the first wiring layer 2, the first wiring layer 2 can provide a good thermal insulation to avoid influence on the magnetic material during the laser direct writing.

In the fourth step, etching the exposed first wiring layer 2 to form at least one first pattern on the first wiring layer 2 which acts as a winding, where the first pattern surrounds the magnetic core for at least once circle.

Optionally, after the fourth step, the following step may be added to remove the remaining first protective layer, which specifically is determining whether to remove the first protective layer according to the material of the first protective layer. For example, in the case that tin is adopted to form the protective layer, it may be determined according to requirements whether to remove the tin protective layer using an etching solution after the related pattern is etched on the coated metal layer. Certainly, in the case that gold is used to form the protective layer, it may be determined to keep the protective layer, and since the gold protective layer is extremely thin, the edge part may also be removed by processes such as water-jet cutting, abrasive blasting, or ultrasound.

FIG. 31*a* is a schematic diagram of a variant 1 of the sixth magnetic element according to Embodiment 3 of the present disclosure. Referring to FIG. 31*a*, the seventh transitional horizontal portion 614 is disposed on the side of the third vertical portion 601 close to the second vertical portion 301. The specific manufacturing process of the structure may be: obtaining the first wiring layer 2 by laser etching; then forming the second insulation layer 5 on the outer side of the first wiring layer 2, and subsequently forming a waist groove on the second insulating layer 5; forming a surface copper and a hole copper respectively on the surface of the second insulation layer 5 and on the inner surface of the waist groove through the metallization process; after dividing the hole copper into sidewall coppers (the second vertical portion 301 and the third vertical portion 601) that are oppositely disposed through the mechanically dividing process, filling the groove between the second vertical portion 301 and the third vertical portion 601 by adopting a plugging hole process; and then performing the metallization electroplating on the upper and lower surfaces of the entire structure, where the seventh transitional horizontal portion 614 which is located on an outer side of the third vertical portion 601 of FIG. 31 continues to be electroplated to the inner side, so that a partial structure of the seventh transitional horizontal portion 614 is located right above the groove, i.e., the area between the second vertical portion 301 and the third vertical portion 601, thereby making full use of the space above the groove. Since the structure is formed by electroplating after filling the hole, the thickness thereof is thinner than that of coppers in other positions. A conductive cylinder 615 and a surface copper may be formed in subsequent processes, and the surface copper serves as the third horizontal portion 602, the specific implementation of which may be obtained with reference to aforementioned embodiments. Since in practical processing, a continuous processing is adopted, it is only needed to ensure that the third vertical portion 601 is not cut during the board separating, while there is no need to provide excessive margin. This structure can make full use of the space between the second vertical portion 301 and the third vertical portion 601 to form the seventh transitional vertical portion 614, so that the formed conductive cylinder 615 will be located between the second vertical portion 301 and the third vertical portion 601, thereby the space utilization will be more reasonable, and the power density will be improved.

FIG. 31*b* is a schematic diagram of a variant 2 of the sixth magnetic element according to Embodiment 3 of the present disclosure, which, with reference to FIG. 31*b*, differs from the sixth magnetic element of FIG. 31 in that the formed third wiring layer 6 includes the third vertical portion 601, the seventh transitional horizontal portion 614 and a third additional vertical portion 616, where the third additional vertical portion 616 and the third vertical portion 601 are connected via the seventh transitional horizontal portion 614. The third vertical portion 601 is directly connected with the third horizontal portion 602, instead of being connected via a conductive cylinder. The structure can effectively improve the current flow capacity of the third wiring layer 6. The manufacturing process thereof is that, after forming the second vertical portion 301 and the third vertical portion 601 through the mechanically dividing process, the third wiring layer 6 is formed on the outer surface of the entire structure through the metallization process.

FIG. 31*c* is a schematic diagram of a variant 3 of the sixth magnetic element according to Embodiment 3 of the present disclosure, which, with reference to FIG. 31*c*, differs from the sixth magnetic element of FIG. 31 in that, after forming the second vertical portion 301 and the third vertical portion 601 through the mechanically dividing process, the third vertical portion 601 and the seventh transitional horizontal portion 614 are cut off through the drilling process, where the hole is located between two adjacent module units; and then the third wiring layer 6 is formed through the metallization process.

FIG. 32 is a schematic structural diagram of a seventh magnetic element according to Embodiment 3 of the present disclosure. Referring to FIG. 32, in another possible structure, the first wiring layer 2, the second wiring layer 3, the third wiring layer 6 and a fourth wiring layer 8 are provided respectively to the magnetic core 1 from the inside to the outside. With respect to the structure with four metal wiring layers, a surface copper can be added based on the fourth magnetic element of the foregoing FIG. 27 to form the structure with four wiring layers, and the specific process can be understood by referring to the aforementioned embodiments, which is not repeated here.

Because a certain degree of a chemical shrinkage occurs during the process of moulding the first insulation layer 4, it is resulted in that a stress will be generated between the first insulation layer 4 and the magnetic core 1 due to differences in shrinking degree; and a certain degree of a physical expansion or shrinkage occurs in the entire module in practical application due to changes in external environment such as in humidity and temperature, which results in a stress generated between the magnetic column and peripheral materials (which includes the first insulation layer 4, the second insulation layer 5 and the metal wiring layers) due to different degrees in expansion or shrinkage. No matter for the chemical shrinkage or the physical expansion or shrinkage, an equivalent CTE may be used for representing the degree of expansion or shrinkage of the size which is caused by material moulding as well as changes in temperature and humidity. An increase in the stress may be caused by mismatching in the equivalent CTE for different materials, which leads to an increase in a magnetic loss and a decrease in the entire power module. Therefore, in order to reduce the stress applied to the magnetic core, the equivalent CTE of the first insulation layer 4 from 170° C. to the room temperature which is significantly higher than the equivalent CTE of the second insulation layer 5 is selected, which makes the shrinking degree of the first insulation layer 4 significantly greater than that of surrounding structures, thereby leading to a separation between the first insulation layer 4 and its surrounding structures. In this case, the magnetic core is no longer subjected to any constraining force. Certainly, some materials that is capable of decomposing in temperature higher than 170° C. and lower than 260° C. may be selected, such as polyvinyl alcohol (PVA). Thermal-stable PVA powders are gradually changed in appearance while heated to around 100° C.; partial-alcoholysis PVA begins to melt around 190° C. and decompose in 200° C.; and complete-alcoholysis PVA begins to melt around 230° C. and decompose in 240° C., therefore, the decomposition of the material may be realized under a certain temperature by adjusting the degree of alcoholysis, thereby reducing the constraining force of the peripheral structure of the first insulating layer 4 to the magnetic core 1.

In order to reduce the stress applied to the magnetic core, another possible structure may be taken into consideration. FIG. 31*d* is a schematic diagram of a variant 4 of the sixth magnetic element according to Embodiment 3 of the present disclosure. As shown in FIG. 31*d*, a low-melting-point material 9 is provided between the first insulation layer 4 and the magnetic core 1, and the melting point of the low-melting-point material 9 is lower than 200° C. Paraffin is an example of the material. The melting point of the paraffin is reached when the temperature is raised to tens of degree Celsius, and in this case, there is no any acting force between the magnetic core 1 and the first insulation layer 4. No matter forming the first insulation material 4 with a material easy to be decomposed or providing a low-melting-point material between the first insulation material 4 and the magnetic core 1, an exhaust channel 91 needs to be provided to expel the decomposed or melted material outside the module. The exhaust channel 91 may be located on the upper surface, lower surface or sides of the magnetic core 1, which is not limited here.

In this embodiment, continuing to drill in the waist groove and forming a metal wiring layer through the metallization process can effectively reduce the footprint of the power module. In the copper plating process, the thickness of the copper in the waist groove is generally related to the inner diameter of the groove. For example, for forming a copper with thickness of 70 μm, the required inner diameter of the waist groove shall be at least 400 μm. Obviously, the thickness of the sidewall coppers of the first wiring layer 2 and the third wiring layer 6 are significantly greater than the thickness of the copper of the second wiring layer 3, resulting in different current-carrying capacities. In practical application, for example, with respect to a transformer module on an LLC module for converting voltage from 48V to 5V, the secondary winding has lower voltage and larger current than the primary winding, therefore the secondary winding may be formed on the first wiring layer 2 and the third wiring layer 6, and the primary winding may be formed on the second wiring layer 3. In combination with Embodiment 1 and Embodiment 2, corresponding structure and technique can be selected according to different applications.

In this embodiment, further, the metal winding includes a first metal winding, a second metal winding and a third metal winding, where at least part of the first metal winding is formed on the first wiring layer 2, at least part of the second metal winding is formed on the second wiring layer 3, and at least part of the third metal winding is formed on the third wiring layer 6; at least part of the first metal winding is covered by the second insulation layer 5, and at least part of the second metal winding is covered by the third insulation layer 7; at least part of the first metal winding is covered by the second metal winding, and at least part of the second metal winding is covered by the third metal winding; at least part of the second insulation layer 4 is covered by the second metal winding, and at least part of the third insulation layer 7 is covered by the third metal winding. For example, the magnetic element may serve as a transformer, and three metal wiring layers form a primary winding, a first secondary winding and a second secondary winding of the transformer respectively. The second wiring layer 3 forms the primary winding, the first wiring layer 2 forms the first secondary winding, and the third wiring layer 6 forms the second secondary winding; or, the second wiring layer 3 forms the primary winding, a part of the first wiring layer 2 and a part of the third wiring layer 6 form the first secondary winding, and the other part of the first wiring layer 2 and the other part of the third wiring layer 6 form the second secondary winding.

It should be further noted that the expression “cover” used in the application may be either contact coverage or contactless coverage, such as a projecting coverage. As described above, in the description of “at least part of the first metal winding is covered by the second insulation layer 4”, the expression “cover” indicates a contact coverage; and likewise, in the description of “at least part of the second insulation layer 4 is covered by the second metal winding”, the expression “cover” also indicates a contact coverage. While in the description of “at least part of the first metal winding is covered by the second metal winding”, the expression “cover” indicates a contactless coverage, i.e. a projecting coverage.

In terms of electrical characteristics, since the distances of the formed metal winding to the same surface of the magnetic core 1 are almost equal, i.e. equivalent diameters of all parts of the winding that has a flat wound structure are close, equivalent impedances thereof are close, which realizes an even distribution of the currents in the metal winding.

It should be noted that the above processes are illustrated by forming a winding structure of a metal wiring layer on one section of magnetic column. FIG. 33 is a schematic structural diagram of a magnetic element formed by butting two units according to an embodiment of the present disclosure. Referring to FIG. 33, in practical processing, a magnetic substrate may be formed by splicing a plurality of magnetic columns; after the required metal windings are formed on the periphery of the magnetic column, the spliced structure is cut into independent units, and then these independent units are spliced to form a magnetic element, optionally by butting two units, or by end-to-end connecting four units, to which the practical form of splicing is not limited. Forming the magnetic column by butting two units is taken as an example, and the formed three-dimensional structure is as shown in FIG. 33. An air gap needs to be provided between two magnetic columns, and a change of the air gap causes a change in the magnetic inductance of the transformer; thus a required magnetic inductance value may be obtained by adjusting the size of the air gap. Certainly, a plurality of zones may be simultaneously disposed on one magnetic substrate to process a plurality of magnetic elements, and finally independent magnetic elements are formed by cutting the magnetic substrate. No matter which kind of aforementioned splicing structure is applied, a plurality of magnetic elements can be produced simultaneously in one processing, which can significantly improve the production efficiency.

Embodiment 4

Based on the structures of the magnetic elements and the manufacturing methods thereof according to Embodiment 1 to Embodiment 3 of the present disclosure, in this embodiment, FIG. 34 is a schematic structural diagram 1 of a magnetic element according to Embodiment 4 of the present disclosure. Referring to FIG. 34, a structure of a plurality of waist grooves 105 may be formed on the insulation layer 101.

Providing the first wiring layer 2 and the second wiring layer 3 outside the magnetic core 1 is taken as an example, in which the first wiring layer 2 is a multi-turn metal winding structure, and the second wiring layer 3 is a single-turn winding structure. FIG. 35 is a flowchart of a manufacturing method of a magnetic element according to Embodiment 4 of the present disclosure. The specific manufacturing method includes the following steps.

S701, forming the first insulation layer 4 on the outer side of the magnetic core 1.

S702, forming a plurality of waist grooves 105 on the first insulation layer 4. FIG. 34 is referred to.

S703, forming the first wiring layer 2 through the metallization process, and dividing the first wiring layer 2 to form a multi-turn metal winding through the mechanically dividing process.

FIG. 36 is schematic structural diagram 2 of a magnetic element according to Embodiment 4 of the present disclosure. Referring to FIG. 36, specifically, a plurality of the waist grooves 105 are provided on the first insulation layer 4; the first hole coppers 107 are formed within the waist grooves 105, and the surface copper 106 is formed on the upper surface and lower surface of the first insulation layer 4 through the metallization process. Positions of the waist grooves 105 may be designed to fit with a multi-turn structure of the surface copper 106. For example, the waist groove 105 corresponds to the width of the surface copper 106, and the distance between two waist grooves 105 corresponds to the gap of the winding of the surface copper 106. The first hole copper 107 is divided into a first sidewall copper close to the magnetic core 1 and a second sidewall copper away from the magnetic core 1 in the central position of the end of the waist groove through the mechanically dividing process, and the surface copper 106 is also divided into a first surface copper close to the magnetic core 1 and a second surface copper away from the magnetic core 1. The first sidewall coppers and the first surface copper are connected to form the first wiring layer 2.

S704, forming the second insulation layer 5 and the second wiring layer 3 outside the first wiring layer 2.

By providing a plurality of waist grooves, a good connective relationship between structures on two sides of the waist grooves can be ensured, which brings a better structural stability, a more uniform force and a better processing stability.

Referring to the structure as shown in FIG. 18, the first wiring layer 2 has a multi-turn metal winding structure, and the second wiring layer 3 has a single-turn metal winding structure. On the basis of the above-mentioned FIG. 36, the grooves can be filled using the plugging hole process to form the second insulation layer 5, and then the first conductive cylinder and the third surface copper are respectively formed using the drilling process and the metallization process; and multiple segments of the second sidewall coppers and the second surface copper are connected as a whole via the first conductive cylinder and the third surface copper, i.e. the second wiring layer 3 is formed.

Embodiment 5

Embodiment 5 of the present disclosure provides a power module, including: a power switch and the magnetic element according to Embodiment 1 to Embodiment 4 as described above, where the power switch and a winding in the magnetic element are electrically connected.

The power module includes a transformer module, and the first insulation layer, the first wiring layer, the second insulation layer, the second wiring layer, the third insulation layer and the third wiring layer are sequentially provided on the magnetic core from inside to outside.

FIG. 37 is a schematic electrical diagram of terminals of a power module according to Embodiment 5 of the present disclosure, and FIG. 38 is a top view of a structure of a transformer module in the power module according to Embodiment 5 of the present disclosure. The metal winding of the third wiring layer, for example, serves as a secondary side S2 of the transformer module, and two ends of this winding structure include a first end and a second end that can form respectively a first surface-mount pin VO and a second surface-mount pin D2 on an outside surface of the transformer module. The metal winding of the first wiring layer, for example, serves as a secondary side S1 of the transformer module, and two ends of this winding structure also include a first end and a second end. Since the metal winding of the first wiring layer is located in an inner layer of the transformer module and covered by an insulation layer, connections to the first surface-mount pin VO and a third surface-mount pin D1 on an outer layer can be realized through vias (which are not shown). The metal winding of the second wiring layer, for example, serves as a primary winding P, and two ends of this winding structure also include a first end and a second end that are connected to a fourth surface-mount pin P1 and a fifth surface-mount pin P2 on the outer layer through vias so as to electrically connect with external circuits.

Further, as shown in FIG. 37, the power module further includes a first power switch (SR1) and a second power switch (SR2), where a first end of the second power switch is electrically connected to the second surface-mount pin D2, a first end of the first power switch is electrically connected to the third surface-mount pin D1, and a second end of the first power switch is electrically connected to a second end of the second power switch and connected to the GND, to which this embodiment is not limited. Actually, each power switch as shown in the figure may be equivalent to multiple power switches in a parallel connection according to power levels of the devices.

Further, the power module further includes a capacitor module, for example, serving as capacitors that have different functions such as an LC resonant capacitor or an output capacitor, to which the present disclosure is not limited. Further, the capacitor module is located on a carrier board and disposed adjacent to the transformer module, and the capacitor module is electrically connected to the first surface-mount pin VO. The power module may also include an LLC primary power unit, a controller, etc., so that the power module serves as an LLC converter.

It should be noted that the forgoing power module is not limited to the LLC converter, but is also applicable to any circuit including a transformer module, such as a flyback converter, a full-bridge circuit, etc.

It can be seen that the power module is easy to be produced in a modularized manner, in which multiple power switches are integrated on a carrier board to form a switch module firstly, then multiple transformer modules are surface-mounted on the switch module, and finally multiple power modules are produced at one time by cutting, to which the present disclosure is not limited.

Further, the power switch is directly connected with multiple output PINs of the transformer module, which leads to a low connection loss; and a primary circuit and a secondary circuit of the transformer module are directly coupled together, which leads to a low alternating current impedance of the winding and a low alternating current loss, to which the present disclosure is not limited.

FIG. 39 is a schematic diagram 1 of an arrangement of metal windings according to Embodiment 5 of the present disclosure. As shown in FIG. 39, in practical application, the first metal winding, the second metal winding and the third metal winding may be correspondingly located on the first wiring layer, the second wiring layer and the third wiring layer. The via indicated by a dotted line and the via indicated by a solid line are not in the same cross section.

FIG. 40 is a schematic diagram 2 of an arrangement of metal windings according to Embodiment 5 of the present disclosure, and FIG. 41 is a schematic diagram 3 of an arrangement of metal windings according to Embodiment 5 of the present disclosure. Referring to FIG. 40 and FIG. 41, the metal winding and the wiring layer may be arranged in different layers.

In FIG. 40, the first metal winding which is wound flat around the magnetic core 1, includes a first section of winding 821 formed on the first wiring layer and a second section of winding 822 formed on the third wiring layer, where a first end of the first section of winding 821 is electrically connected to a first end of the second section of winding 822 through a via, a second end of the first section of winding 821 is electrically connected to the first surface-mount pin VO through a via, and a second end of the second section of winding 822 is connected to the third surface-mount pin D1. In FIG. 41, the third metal winding which is also flat wound around the magnetic core 1, includes a third section of winding 831 provided on the first wiring layer and a fourth section of winding 832 formed on the third wiring layer, where a first end of the third section of winding 831 is connected to a first end of the fourth section of winding 832 through a via, a second end of the fourth section of winding 832 forms the second surface-mount pin D2, and a second end of the third section of winding 831 is connected to the first surface-mount pin VO through a via. In this way, the first metal winding and the third metal winding form the connection structure of the secondary windings S1 and S2 of the transformer as shown in FIG. 37. The winding P of the transformer of FIG. 37 is the foil-winding second metal winding 81 located on the second wiring layer as shown in FIG. 40 and FIG. 41. Compared with the arrangement as shown in FIG. 39 in which the same winding is located on the same wiring layer, arranging the secondary windings S1 and S2 on different layers as shown in FIG. 40 and FIG. 41 brings a better symmetry of the two windings, which can significantly improve the effect of uniform distribution of the current flowing through the first power switch and the second power switch.

Finally, it should be noted that the above embodiments are merely for illustrating the technical solutions of the present disclosure, but not being construed as limitations to the present disclosure. Although the present disclosure is described in detail with reference to the foregoing embodiments, a person skilled in the art should understand that the technical solutions described in the foregoing embodiments can still be modified, or some or all of the technical features can be equivalently replaced; and these modifications or replacements do not deviate the essence of corresponding technical solutions from the scope of the technical solutions of the embodiments of the present disclosure.

What is claimed is:

1. A manufacturing method of a magnetic element, comprising:

forming an insulation layer on an outer side of at least one section of a magnetic column of a magnetic core;

forming a metal wiring layer on an outer side of the insulation layer through a metallization process; and dividing at least part of the metal wiring layer into a multi-turn metal winding through a mechanically dividing process.

2. The manufacturing method according to claim 1, wherein the forming the metal wiring layer on the outer side of the insulation layer through the metallization process specifically comprises:

forming a first waist groove on the insulation layer by adopting a drilling process, wherein the number of the first waist groove is one or more; and forming a surface copper and a first hole copper respectively on a surface of the insulation layer and an inner surface of the first waist groove by adopting the metallization process, wherein the surface copper and the first hole copper together form the metal wiring layer;

wherein the dividing at least part of the metal wiring layer into the multi-turn metal winding through the mechanically dividing process specifically comprises:

dividing the first hole copper into a multi-segment structure through the mechanically dividing process, and connecting multiple segments of the first hole copper correspondingly with multiple segments of the surface copper to form the multi-turn metal winding.

3. The manufacturing method according to claim 2, after forming the surface copper and the first hole copper respectively on the surface of the insulation layer and on the inner surface of the first waist groove by adopting the metallization process, further comprising:

dividing the surface copper into a first surface copper close to the magnetic core and a second surface copper away from the magnetic core, and dividing the first hole copper into a first sidewall copper close to the magnetic core and a second sidewall copper away from the magnetic core, by adopting the mechanically dividing process at an end of the first waist groove along a depth direction of the first waist groove;

wherein the first surface copper and the first sidewall copper serve as a first horizontal portion and a first vertical portion respectively and together form a first wiring layer wound flat around the magnetic core, and an insulation layer between the first wiring layer and the magnetic core is a first insulation layer.

4. The manufacturing method according to claim 3, wherein, the manufacturing method further comprises:

pressing an insulation material into a gap between the first sidewall copper and the second sidewall copper, wherein the insulation material is higher than the first wiring layer to form a second insulation layer; and drilling a hole on the second insulation layer, and forming a first conductive cylinder and a third surface copper respectively in the hole and on the second insulation layer through the metallization process, wherein the first conductive cylinder is located above the second surface copper;

wherein the third surface copper, the second surface copper and the second sidewall copper serve as a second horizontal portion, a first transitional horizontal portion and a second vertical portion respectively, and form a second wiring layer flat wound around the magnetic core together with the first conductive cylinder.

5. The manufacturing method according to claim 4, wherein, the manufacturing method further comprises:

forming a third insulation layer on an outer side of the second wiring layer; and forming a third wiring layer on an outer side of the third insulation layer through the metallization process, wherein the third wiring layer comprises a third vertical portion and a third horizontal portion.

6. The manufacturing method according to claim 4, wherein, the manufacturing method further comprises:

forming a fourth surface copper and a third sidewall copper respectively on upper and lower surfaces and on sides of the insulation layer with positions away from the surface copper and the first hole copper, wherein the fourth surface copper is coplanar with the surface copper, and the third sidewall copper is parallel to the first hole copper;

drilling a hole on the second insulation layer, and forming a second conductive cylinder and a fifth surface copper respectively in the hole and on the second insulation layer through the metallization process, wherein the second conductive cylinder and the fifth surface copper are located above the fourth surface copper, and the fifth surface copper is coplanar with the third surface copper;

pressing an insulation material onto the second wiring layer to form a third insulation layer; and drilling a hole on the third insulation layer, and forming a third conductive cylinder and a sixth surface copper respectively in the hole and on a surface of the third insulation layer through the metallization process, wherein the third conductive cylinder is located above the fifth surface copper;

wherein the third sidewall copper, the fourth surface copper, the fifth surface copper and the sixth surface copper serve as a third vertical portion, a second transitional horizontal portion, a third transitional horizontal portion and a third horizontal portion respectively, and form a third wiring layer flat wound around the magnetic core together with the second conductive cylinder and the third conductive cylinder.

7. The manufacturing method according to claim 3, wherein, the manufacturing method further comprises:

pressing an insulation material into a gap between the first sidewall copper and the second sidewall copper, wherein the insulation material is higher than the first wiring layer to form a second insulation layer;

forming a second waist groove between the first sidewall copper and the second sidewall copper by adopting the drilling process; and forming, through the metallization process, a seventh surface copper on a surface of the second insulation layer and forming a second hole copper on an inner surface of the second waist groove.

8. The manufacturing method according to claim 7, further comprising:

dividing the seventh surface copper into an eighth surface copper close to the magnetic core and a ninth surface copper away from the magnetic core, and dividing the second hole copper into a fourth sidewall copper close to the magnetic core and a fifth sidewall copper away from the magnetic core, by adopting the metallization process at an end of the second waist groove along a depth direction of the second waist groove;

wherein the eighth surface copper and the fourth sidewall copper serve as a second horizontal portion and a second vertical portion respectively, and together form a second wiring layer flat wound around the magnetic core;

drilling a hole on the second insulation layer, and forming a fourth conductive cylinder in the hole through the metallization process, wherein the fourth conductive cylinder is located above the second surface copper;

forming a third insulation layer on an outer side of the second wiring layer; and drilling a hole on the third insulation layer, and forming a fifth conductive cylinder and a tenth surface copper respectively in the hole and on the third insulation layer through the metallization process, wherein the fifth conductive cylinder is located above the ninth surface copper;

wherein the second sidewall copper, the second surface copper, the fifth sidewall copper, the ninth surface copper and the tenth surface copper serve as a third vertical portion, a fourth transitional horizontal portion, a second additional vertical portion, a fifth transitional horizontal portion and a third horizontal portion respectively, and form a third wiring layer flat wound around the magnetic core together with the fourth conductive cylinder and the fifth conductive cylinder.

9. The manufacturing method according to claim 7, further comprising:

forming a second wiring layer flat wound around the magnetic core together by the seventh surface copper and the second hole copper that serve as a second horizontal portion and a second vertical portion respectively;

forming a third insulation layer on an outer side of the second wiring layer; and drilling a hole on the third insulation layer, and forming a sixth conductive cylinder and an eleventh surface copper respectively in the hole and on the third insulation layer through the metallization process, wherein the sixth conductive cylinder is located above the second surface copper;

wherein the second sidewall copper, the second surface copper and the eleventh surface copper serve as a third vertical portion, a sixth transitional horizontal portion and a third horizontal portion respectively, and form a third wiring layer flat wound around the magnetic core together with the sixth conductive cylinder.

10. The manufacturing method according to claim 1, wherein the forming the insulation layer on the outer side of the magnetic core specifically comprises:

forming the insulation layer on the outer side of the magnetic core by performing spraying, dipping, electrophoresis, electrostatic spraying, chemical vapor deposition, physical vapor deposition or evaporation plating using an insulation material; or, forming the insulation layer by injecting an insulation material on the outer side of the magnetic core; or, processing an empty groove on a PCB core board, placing the magnetic core into the empty groove, making the magnetic core and the PCB core board located on a same horizontal plane, pressing an insulation material into a gap between the magnetic core and the PCB core board and making the insulation material higher than a surface of the PCB core board, so as to form the insulation layer by the PCB core board and the insulation material.

* * * * *